US011983301B2

(12) United States Patent
Clines

(10) Patent No.: US 11,983,301 B2
(45) Date of Patent: May 14, 2024

(54) SYSTEMS AND METHODS FOR VIRTUAL TRAFFIC STOPS

(71) Applicant: REDLIN COLLECTIVE HOLDINGS LLC, Austin, TX (US)

(72) Inventor: Nicole Faren Clines, Austin, TX (US)

(73) Assignee: Redlin Collective Holdings LLC, Austin, TX (US)

( * ) Notice: Subject to any disclaimer, the term of this patent is extended or adjusted under 35 U.S.C. 154(b) by 491 days.

(21) Appl. No.: 17/351,054

(22) Filed: Jun. 17, 2021

(65) Prior Publication Data

US 2021/0394764 A1  Dec. 23, 2021

Related U.S. Application Data

(60) Provisional application No. 63/040,959, filed on Jun. 18, 2020.

(51) Int. Cl.
| | | |
|---|---|---|
| *G06F 21/64* | (2013.01) |
| *B60W 40/08* | (2012.01) |
| *G06F 16/538* | (2019.01) |
| *G06F 16/93* | (2019.01) |
| *G06V 30/40* | (2022.01) |
| *H04W 4/40* | (2018.01) |

(52) U.S. Cl.
CPC ............. *G06F 21/64* (2013.01); *B60W 40/08* (2013.01); *G06F 16/538* (2019.01); *G06F 16/93* (2019.01); *G06V 30/40* (2022.01); *H04W 4/40* (2018.02); *B60W 2540/221* (2020.02); *B60W 2540/24* (2013.01)

(58) Field of Classification Search
CPC ........ G06F 21/24; G06F 16/93; G06F 16/538; G06F 21/64; H04W 4/40; G06V 30/40; B60W 40/08; B60W 2540/221; B60W 2540/24; B60W 2040/0836
USPC ............................................................ 701/1
See application file for complete search history.

(56) References Cited

U.S. PATENT DOCUMENTS 8,219,817 B2 *  7/2012  Filreis ................... H04L 9/3247
                                                   713/181
8,243,140 B1     8/2012  Howe
                         (Continued)

FOREIGN PATENT DOCUMENTS

KR   1020060031967 A    4/2006
KR   1020070059678 A    6/2007

OTHER PUBLICATIONS

University of Florida Research Foundation, Virtual Traffic Stop, 2023, University of Florida Research Foundation , inc, pp. 1-4 (pdf).*

(Continued)

*Primary Examiner* — Manglesh M Patel
(74) *Attorney, Agent, or Firm* — Lewis Rice LLC

(57) ABSTRACT

Systems and methods to implement virtual contactless traffic stops. The systems and methods utilize mobile devices or other computer technology commonly carried by law enforcement officers and civilians for other purposes, and use the imaging and communication capabilities of these devices to authenticate digital copies a legal documents pertaining to the civilian, connect a civilian device and a law enforcement officer device during a traffic stop to facilitate digital document exchange, and to provide for remote interaction during the traffic stop, such as by use of video or text chat.

15 Claims, 17 Drawing Sheets

(56) References Cited

U.S. PATENT DOCUMENTS

| | | | |
|---|---|---|---|
| 8,406,480 B2* | 3/2013 | Grigsby | G06F 18/00 |
| | | | 382/116 |
| 10,171,476 B2* | 1/2019 | Khan | H04L 9/3234 |
| 10,943,104 B2* | 3/2021 | Thompson | G08G 1/09 |
| 11,010,922 B1 | 5/2021 | Gingrich | |
| 2003/0055701 A1 | 3/2003 | Dutta et al. | |
| 2003/0200227 A1 | 10/2003 | Ressler | |
| 2008/0042815 A1 | 2/2008 | Breed et al. | |
| 2008/0238719 A1 | 10/2008 | Marchasin et al. | |
| 2009/0244293 A1* | 10/2009 | Schaffner | G06Q 90/00 |
| | | | 345/173 |
| 2010/0085418 A1 | 4/2010 | Sampsel et al. | |
| 2011/0121991 A1 | 5/2011 | Basir | |
| 2012/0116661 A1 | 5/2012 | Mizrachi | |
| 2013/0144469 A1 | 6/2013 | Ricci | |
| 2014/0149454 A1 | 5/2014 | Eid | |
| 2014/0306826 A1* | 10/2014 | Ricci | G01C 21/26 |
| | | | 340/573.1 |
| 2014/0310031 A1 | 10/2014 | Ricci | |
| 2014/0368601 A1 | 12/2014 | deCharms | |
| 2015/0057838 A1 | 2/2015 | Scholl et al. | |
| 2015/0312400 A1 | 10/2015 | Hansen | |
| 2015/0332023 A1* | 11/2015 | Gisolfi | H04L 63/123 |
| | | | 726/31 |
| 2016/0163011 A1 | 6/2016 | Zimmerman et al. | |
| 2017/0164178 A1 | 6/2017 | Anjum et al. | |
| 2018/0222059 A1 | 8/2018 | Ragula et al. | |
| 2019/0095707 A1 | 3/2019 | Thompson | |
| 2019/0272743 A1* | 9/2019 | Henry | H04W 4/029 |
| 2019/0304297 A1* | 10/2019 | Burley, IV | G08G 1/04 |
| 2019/0318618 A1 | 10/2019 | Gilbert et al. | |
| 2020/0097708 A1* | 3/2020 | Thompson | G06V 20/56 |
| 2022/0277598 A1* | 9/2022 | Liu | H04W 4/38 |

OTHER PUBLICATIONS

Sarah Calams, Technology created by cops gives LEO's a contact-free option for minor traffic stops, Feb. 22, 2023 Police 1, pp. 1-7 (pdf).*

Benjamin Raziel, A New App Seeks To Transform Traffic Stops, Sep. 22, 2023, Forbes.com, pp. 1-7 (pdf).*

International Search Report and Written Opinion issued for PCT/US2021/037942, mailed Oct. 12, 2021, 14 pages.

* cited by examiner

Sobriety test example A, matching image assessment

Note. The test subject will have to select matching images before time elapses. Test simulations will be randomly generated as well as the arrangement of images presented.

Directions the image can move in a moving image assessment

Note. The shapes that appear on the screen in the assessment can move any of the directions indicated by arrows.

SYSTEMS AND METHODS FOR VIRTUAL TRAFFIC STOPS

CROSS-REFERENCE TO RELATED APPLICATIONS

This application claims benefit of U.S. Prov. Pat. App. No. 63/040,959, filed Jun. 18, 2020, the entire disclosure of which is incorporated herein by reference

BACKGROUND OF THE INVENTION

Field of the Invention

This disclosure is related to the field of law enforcement technology, and more particularly to systems and methods for facilitating a virtual traffic stop.

Description of the Related Art

Almost every driver is familiar with the routine traffic stop, where a law enforcement officer temporarily detains the operator of a motor vehicle to investigate a possible violation of law or a safety concern, colloquially known as being "pulled over." Typically, a law enforcement officer in a vehicle approaches a civilian's vehicle from behind, and alerts the civilian to the officer's intention to detain the driver temporarily. This is typically done through the use of audible sirens and brightly flashing lights. Generally, the civilian pulls over when safely possible, and the officer pulls off the road behind the detained vehicle.

Depending upon the reason for the detention, any number of things may happen at this point. In a routine traffic stop, the officer approaches the detained vehicle and requests documentation drivers are legally required to carry, such as proof of vehicle registration, a valid driver's license, and proof of vehicle insurance. The officer may take this documentation back to the police vehicle and use a computer system in the police vehicle to research records pertaining to the vehicle or driver. The officer may also interview or interrogate the driver to collect additional information or evidence about the suspected violation. The officer will then make a charging decision, and may issue a citation or warning. If the officer has cause to believe a more serious condition exists, such as an impaired driver or the presence of contraband or unlawful substances in the vehicle, the officer may inspect the vehicle or conduct a field sobriety test.

Unfortunately, even routine traffic stops can go wrong. Anytime a law enforcement officer interacts with a civilian in the context of a potential violation of law, the situation is inherently tense. The civilian may be anxious, and all encounters bear some degree of danger for the officer in question. In the worst of circumstances, a routine traffic stop can become confrontational and violent. Both civilians and officers have been injured, or lost their lives, as a result of such confrontations. In some circumstances, this has led to wider social unrest.

Traffic stops also present risks to the law enforcement officer. By necessity, traffic stops often take place on the shoulder of a roadway, and officers must approach the driver's side. Because in America, traffic proceeds on the right side of the road and the driver position is on the left side of the car, the officer has no choice but to stand close to the roadway. This creates a risk of the officer being struck by passing traffic.

Additionally, even a routine traffic stop involves an exchange of extensive paperwork and information that must be manually entered by the officer into a police database, which is imprecise, error-prone, and contrary to government efforts to reduce paperwork and paper consumption, such as the Paperwork Reduction Act of 1980.

Additionally, the COVID-19 outbreak fundamentally changed the economy and highlighted the need to be prepared to conduct these types of interactions remotely. In a traffic stop, the risk of transmission is present. Although precautions such as sanitizing surfaces and wearing masks may help, the civilian and officer still physically exchange documents during the stop.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for electronic exchange of authenticated digital representations of documents in a contactless traffic stop, the method comprising: providing an application server communicably coupled to a telecommunication network; providing an agency server associated with an agency, the agency server communicably coupled to the telecommunications network; providing a civilian device associated with a civilian, the civilian device communicably coupled to the telecommunications network; providing a police device associated with a police officer, the police device communicably coupled to the telecommunications network; prior to a traffic stop of the civilian by the police officer: the civilian device capturing; a first set of image data of at least one document issued by the agency; receiving, at the agency server via the telecommunications network, a copy of the first set of image data captured by the civilian device; the agency authenticating that the received copy of the first set of image data accurately represents the at least one document issued by the agency; receiving, at the application server from the agency server via the telecommunication network, a copy of the first set of image data authenticated by the agency, and an indication that the agency has authenticated the first set of image data; creating, at the application server, a checksum of the authenticated copy of the first set of image data received from the agency server; and receiving, at the civilian device from the application server via the telecommunications network, the authenticated copy of the first set of image data; and during a traffic stop of the civilian by the officer: receiving, at the civilian device from the police device, a request for an authenticated digital copy of the at least one civilian document; in response to the request, the police device receiving, from the civilian device via the telecommunications network, a second set of image data; receiving, at the application server from the police device via the telecommunications network, a copy of the second set of image data received by the police device; creating, at the application server, a second checksum of the second set of image data received by the application server from the police device; the application server comparing the first checksum and the second checksum; and receiving, at the police device from the application server via the telecommunications network, an indication of the result of the comparing.

In an embodiment of the method, the at least one document is a driver's license issued to the civilian by a licensing bureau, and the agency is the licensing bureau.

In another embodiment of the method, the at least one document is a proof of vehicle registration issued to the civilian by a vehicle registration bureau, and the agency is the vehicle registration bureau.

In another embodiment of the method, the method further comprises: during the traffic stop of the civilian by the officer: receiving, at the civilian device from the police device, a request to conduct a field sobriety test of the civilian; the civilian device displaying on a display of the civilian device an interactive field sobriety test graphical user interface presenting a sequence of tasks to be performed by manipulation of the displayed field sobriety test graphical user interface; the civilian manipulating the displayed field sobriety test graphical user interface to complete the presented sequence of tasks; and during the manipulating, the civilian device capturing a real-time video stream of the civilian performing the manipulating step and transmitting the video stream to the police device.

In a further embodiment of the method, the interactive field sobriety test comprises a game.

In a another embodiment of the method, the interactive field sobriety test game comprises an image matching game in which the civilian is presented with a plurality of similar images, selects one image from the plurality, and is presented with a second plurality of images including the selected image, and the civilian must select from the second plurality of images the one image.

In a another embodiment of the method, wherein the interactive field sobriety test game comprises an image moving game in which the civilian is presented with a plurality of images moving towards the edges of the display and the civilian selects each image of the plurality of images before any of the plurality of images exit the display.

In another embodiment of the method, the method further comprises: during the manipulating step, the police device displaying a timer indicating the amount of time that has passed since the beginning of the manipulating.

In another embodiment of the method, the method further comprises: during the traffic stop of the civilian by the officer, displaying, in real-time on a display of the police device, biometric data for the civilian, the biometric data collected in real-time by a biometric monitoring device of the civilian and transmitted to the police device via the telecommunications network.

Also described herein, among other things, is a system for electronic exchange of authenticated digital representations of documents in a contactless traffic stop, the system comprising: an application server communicably coupled to a telecommunication network; an agency server associated with an agency, the agency server communicably coupled to the telecommunications network; a civilian device associated with a civilian, the civilian device communicably coupled to the telecommunications network; and a police device associated with a police officer, the police device communicably coupled to the telecommunications network; wherein prior to a traffic stop of the civilian by the police officer: the civilian device captures a first set of image data of at least one document issued by the agency; agency server receives via the telecommunications network a copy of the first set of image data captured by the civilian device; the agency authenticates that the received copy of the first set of image data accurately represents the at least one document issued by the agency; the application server receives from the agency server via the telecommunication network, a copy of the first set of image data authenticated by the agency, and an indication that the agency has authenticated the first set of image data; and the application server creates a checksum of the authenticated copy of the first set of image data received from the agency server; and the civilian device receives from the application server via the telecommunications network, the authenticated copy of the first set of image data; and wherein during a traffic stop of the civilian by the officer the civilian device receives from the police device a request for an authenticated digital copy of the at least one civilian document; in response to the request, the police device receives, from the civilian device via the telecommunications network, a second set of image data; the application server receives from the police device via the telecommunications network, a copy of the second set of image data received by the police device; the application server creates a second checksum of the second set of image data received by the application server from the police device; the application server compares the first checksum and the second checksum; and the police device receives from the application server via the telecommunications network, an indication of the result of the comparing.

In an embodiment of the system, the at least one document is a driver's license issued to the civilian by a licensing bureau, and the agency is the licensing bureau.

In another embodiment of the system, the at least one document is a proof of vehicle registration issued to the civilian by a vehicle registration bureau, and the agency is the vehicle registration bureau.

In another embodiment of the system, the system further comprises: wherein during the traffic stop of the civilian by the officer: the civilian device receives fro the police device a request to conduct a field sobriety test of the civilian; the civilian device displays on a display of the civilian device an interactive field sobriety test graphical user interface presenting a sequence of tasks to be performed by manipulation of the displayed field sobriety test graphical user interface; the civilian device capturing a real-time video stream of the civilian manipulating the displayed field sobriety test graphical user interface to complete a presented sequence of tasks; and the civilian device transmitting the real-time video stream to the police device.

In embodiment of the system, the interactive field sobriety test comprises a game.

In embodiment of the system, the game selected from the group consisting of: an image matching game, and an image moving game.

In another embodiment of the system, the system further comprises: the police device displaying a timer indicating the amount of time that has passed since the civilian began manipulating the displayed field sobriety test graphical user interface to complete the presented sequence of tasks.

In another embodiment of the system, the system further comprises: wherein during the traffic stop of the civilian by the officer, the police device displays biometric data for the civilian, the biometric data collected in real-time by a biometric monitoring device of the civilian and transmitted to the police device via the telecommunications network.

Also described herein, among other things, is a computer having a microprocessor and a non-transitory computer-readable medium having program instructions thereon which, when executed by the microprocessor, cause the computer to perform the following steps: capture image data of at least one document issued by an agency to a civilian user of the computer; transmit, via a telecommunications network, a copy of the image data to an agency computer associated with the agency for authentication by the agency;

receive, via the telecommunications network, an authenticated copy of the image data; store the received copy of the authenticated copy of the image data on the non-transitory computer-readable medium; in response to a request for an authenticated copy of the at least one document received from a police device via the telecommunications network during a traffic stop of the civilian user, transmit to the police device a copy of the stored authenticated copy of the image data.

In an embodiment of the computer, the step to receive, via the telecommunications network, an authenticated copy of the image data further comprises receiving the authenticated copy of the image data from the agency server.

In another embodiment of the computer, the step to receive, via the telecommunications network, an authenticated copy of the image data further comprises receiving the authenticated copy of the image data from an application server.

DESCRIPTION OF THE PREFERRED EMBODIMENT(S)

Figure 1:
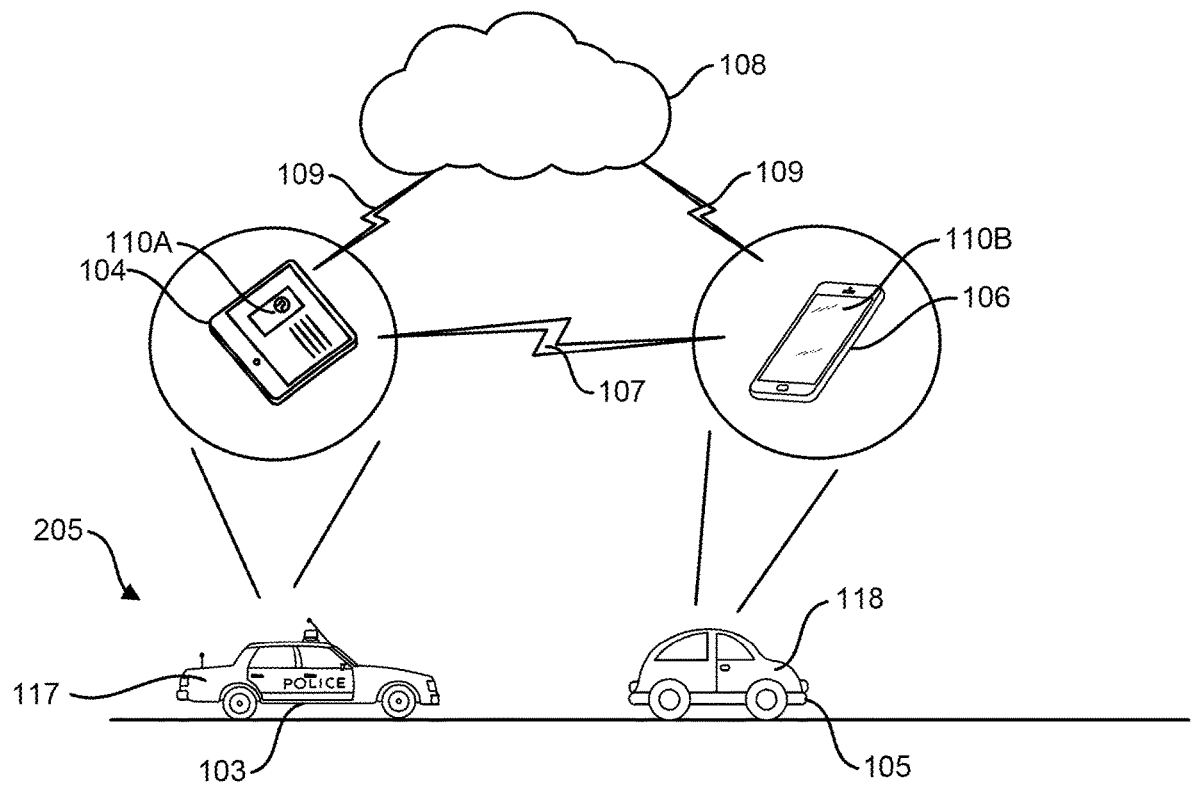
FIG. 1 depicts an embodiment of a virtual traffic stop according to the systems and methods of the present disclosure.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Described herein, among other things, are systems and methods that utilize the mobile devices or other computer technology often carried by both law enforcement officers and civilians to implement virtual or contact-less traffic stops. Generally speaking, the systems and methods described herein use the imaging and communication capabilities of these devices to connect a civilian device and a law enforcement officer device to facilitate digital document exchange and video chat during a traffic stop, reducing the need for the law enforcement officer to approach the vehicle.

For purposes of this disclosure, terms such as "law enforcement officers" and "police" generally mean a public official or employee, who may be elected to an office or employed by a governmental body or agency whose job duties concern the enforcement of laws on behalf of the public, typically with direct and unplanned contact with the general public in response to observing a potential violation or law, or a report of a potential violation of law. Examples include, but are not necessarily limited to, municipal police, county sheriffs, state troopers, special agents and investigators (e.g., FBI and Secret Service agents), detectives and investigators, border patrol and immigration officers, bailiffs, parole officers, probation officers, park rangers and game wardens, deputations, corrections officers, and the like. Additionally, it should be noted that the systems and methods used herein could also be used in other contexts, including in setting involving private or contracted security officers, though use by conventional public sector law enforcement is primarily described herein.

For purposes of this disclosure, the term "civilian" is colloquially used to refer to persons who are not in a law enforcement or fire department, and/or are not part of the armed forces. For purposes of this disclosure, the term has a similar meaning, referring to individuals who have contact with, or are or will interact with, a law enforcement officer as described herein in a non-law enforcement capacity. Thus, the term encompasses individuals who are pulled over by the police for a suspected legal violation. In this sense, even a law enforcement officer who is pulled over in this context is a "civilian" for purposes of this disclosure.

There are a number of difficulties in implementing a virtual traffic stop. First, the civilian and officer must negotiate the commencement of electronic, wireless communication between the civilian's mobile device and the officer's mobile device without either party having prior knowledge of the contact information for the other, and with both parties desiring not to advertise such contact information on their vehicles. Thus, this disclosure describes various systems and methods for beginning such communication.

Second, officers generally begin a traffic stop by requesting copies of legal documents that drivers are required by law to carry while operating, a motor vehicle, such as a license, proof of vehicle registration, and proof of insurance. In a virtual stop, officers will also desire to receive and inspect these documents, and to confirm that they are (or at least appear to be) authentic. Once communication is established, the civilian could simply text or otherwise electronically transfer a photo of these documents to the officer. However, with a digital copy, the opportunity for a civilian to pass a fraudulent or forged document is much higher than if the officer can inspect the physical, paper document. Additionally, it may be difficult for the civilian to capture a legible photograph of the papers on the spot.

Third, once the officer does receive legible digital copies of the documents, it may be difficult or impossible to authenticate them with the agency in question. This problem exists even outside the context of a virtual traffic stop. For example, if an officer seeks to confirm that a proof of vehicle registration is accurate during a traffic stop at 3:00 am on a weekend, the appropriate agency is probably not open, and not all agencies or document issuers (e.g., insurance carriers) have databases that can be accessed outside of standard office hours.

FIG. 1 depicts an embodiment of a virtual traffic stop according to the present disclosure. In the depicted embodiment, a police officer (103) in a police vehicle (117) temporarily detains a civilian (105) in a civilian vehicle (118). In this circumstance, both the officer (103) and the civilian (105) are carrying a respective mobile device a police mobile device (104) and a civilian mobile device (106). Each of the respective mobile devices (104) and (106) has a police virtual traffic stop application (110A) and a corresponding civilian virtual traffic stop application (110B), which may be referred to collectively herein as the "application" or "applications" (110) for brevity.

The applications (110) on each device (104) and (106) may directly communicate (107), such as by use of aa wireless communication protocol. By way of example, and not limitation, one such protocol is IEEE 802.15.1, known commercially as "Bluetooth®." Alternatively, the applications (110) may communicate indirectly via wifeless access to a telecommunications network (108), such as the public Internet. This may be done via an intermediary system, such as an application server (111) connected to the network (108) and programmed with server software to provide various network services to the applications (110), such as authentication and storage, as well as to facilitate and ma age communication and transactions between the applications (110) over the network (108). The application server (111) may also be in direct or indirect network communication with one or more agency servers, such as a department of motor vehicles server (114), department of revenue server (115), or other servers as further described with respect to FIG. 3 and elsewhere herein, including but not limited to other bureaus and agencies such as licensing and records bureaus.

Figure 2:
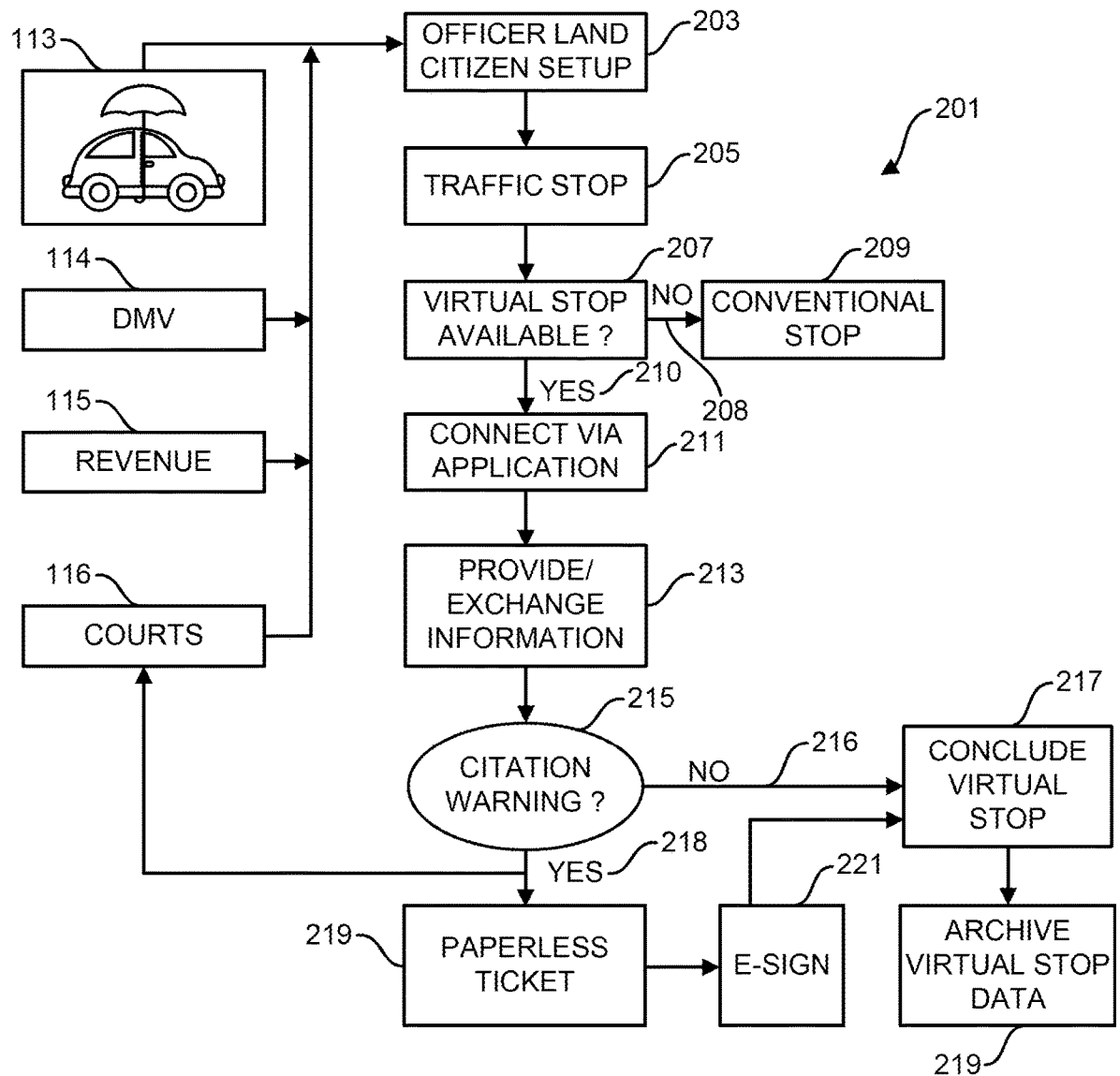
FIG. 2 depicts an embodiment of a method for conducting a virtual traffic stop according to the present disclosure.

FIG. 2 depicts an embodiment of a method for virtual traffic stops according to the present disclosure. In the depicted embodiment of FIG. 2, the applications (110) are downloaded, installed, and configured by or for the police officer (103) on the police mobile device (104), and by or for the civilian (105) on the civilian mobile device (106). This process is described in further detail elsewhere herein, and differs in certain respects for the police officer (103) and civilian (105).

Still referring to FIG. 2, next, a police officer (103) begins a traffic stop (205) by pulling over the civilian (105). Although this disclosure is made with reference to a traffic stop, which is perhaps the most common interaction in which the systems and methods described herein are used, it should be noted that the systems and methods described herein may also be used in other contexts, as well, depending on the type and nature of police officer involved, the suspected infraction (if any), and the nature of the interaction. For example, a parole officer conducting a home visit to a parolee might use the systems and methods upon arrival but before approaching the parolee's home to conduct, or at least commence, the visit virtually.

Next, the police officer (103) may determine whether a virtual traffic stop is possible or available (207) with the particular civilian (105). This may be done by the officer (103) entering the civilian vehicle (114) license plate into the police application (110A). The police application (110A) may then communicate (109) via the network (108) with an application server (111) to perform a lookup of the license plate and determine whether the civilian (105) has previously registered the civilian vehicle's (118) license plate number during the civilian setup process (203), and thus has the civilian application (110B) and can participate in a virtual traffic stop. Additionally, or alternatively, a law enforcement database may also contain this information, and the police officer (103) may look up the license plate number in the law enforcement database to determine whether a virtual traffic stop is available (i.e., whether the civilian (105) has installed and set up a corresponding civilian application (110B)).

In an embodiment, the applications (110) are programmed with a "log into license plate" feature, which allows motorists to use their license plate as a form of authentication or account access, such as by enabling the camera and placing the license plate in the frame. The characters and state of the license plate can be recognized and used to look up the vehicle and load the us account and other information about the vehicle in question, such as which other individuals are authorized users of the vehicle (described elsewhere herein). Likewise, the officer application (110A) may also use this function to automatically search fir the vehicle in law enforcement databases. This function could be implemented automatically in police vehicles outfitted with a dashboard camera, which can image the license plate, recognize the text and state, and automatically conduct the lookup. If the license plate is indicated as having virtual traffic stop available, the virtual traffic stop could also then be automatically commenced.

Other methods for determining whether the virtual stop is available (207) are also possible. For example, the civilian (105) may place a sticker or other visual indicator on the back of the civilian vehicle (118) to indicate that the civilian (105) has installed and configured the civilian application (110B). This visual indicator may comprise an identifier, such as a number assigned to the user. This could be a unique alphanumeric code associated with the driver, the vehicle, or both. This code could also be associated with other permitted drivers, as described elsewhere herein. The officer (103), upon pulling over the civilian (105), may see the sticker or other visual indication, and determine that a virtual traffic stop is available (207).

In a still further embodiment, upon being pulled over, the civilian (105) may sit activate the application (110B) on the civilian mobile device (106), which can automatically enable a short-range transmission protocol (107). The officer (103) can also enable the officer application (110A), and the two applications (110) will attempt to discover and communicate with each other using a wireless radio protocol.

If a virtual traffic stop is not available (208), then a conventional traffic stop (209) may be conducted. If a virtual traffic stop is available (210), then the method (201) proceeds to connect (211) the two applications (110) to facilitate the virtual traffic stop.

One aspect of the systems and methods is the digital and contactless exchange of documentation between the civilian (105) and officer (103). During a routine conventional traffic stop, officers (103) commonly request certain documentation from the civilian (105), chiefly documentation the civilians (105) are legally required to possess while operating a motor vehicle, such as a valid driver's license, proof of insurance, and vehicle registration. Thus, once the connection is made, the civilian application (110B) may provide or exchange information (213) with the officer application (110A). This may be done automatically, or the civilian (105) may be required to manipulate the GUI in the civilian application (110B) to indicate which information the civilian (105) desires to provide. The civilian application (110B) ay be configurable to determine whether automatic or manual snaring is enabled.

The officer (103) may also be able to manipulate the officer application (110A) to communicate to the civilian (105) what information or documents the officer (103) desires to receive. In this fashion, the civilian (105) and the officer (103) may be able to negotiate the exchange of documents and information, such as proof of insurance, proof of vehicle registration, driver's license, and the like, electronically using the applications (110). If, for some reason, the civilian (105) is unable or unwilling to share the information, the stop may become a conventional stop (209).

In an embodiment, the officer (103) may also share information with the civilian (105). For example, the officer application (110A) may provide to the civilian application (1108) the officer's name, photo, badge number, supervisor, station address, how long he or she has been with the department, biographical information, and or other information about the officer (103). Likewise, the civilian (105) may set up (203) the civilian application (110B) to provide information about the civilian (105).

This exchange of information need not be legal information. Some theorize that a confrontation is less likely to escalate when the parties to a dispute have been humanized to one another. Thus, by providing some basic personal information about the civilian (105) and officer (103) to each other, such as biographic or personal information about the civilian's (105) or officer's (103) family, hobbies, or interests, two people who are usually strangers to each other may be humanized.

Additionally, receiving officer (103) information may also provide a safety function for the civilian (105). Criminals seeking to take advantage of civilian (105) trust in law enforcement may sometimes masquerade as police officers and "pull over" civilians (105) in furtherance of a crime, such as a robbery or assault. With a virtual traffic stop, the officer (103) can provide a badge number and other verifying information, which gives the civilian (105) more confidence that the officer (103) is a real police officer and is engaged in a lawful stop, and that there is a record of the stop.

In an embodiment, if the civilian (105) has concerns about the legitimacy of the stop, the civilian application (110B) may include the dispatch number for the police department for the officer (103), which the civilian (105) can then call to confirm that the officer (10) is indeed conducting a lawful traffic stop. Likewise, in a situation where the civilian (105) and officer (103) in question have had previous encounters, either the officer (103) or the civilian (105) may request an additional or replacement officer (103) to participate in the stop, which may reduce the likelihood of prior disagreements escalating.

After the information and/or document exchange (213), the officer (103) may perform ordinary law enforcement procedures or protocols used in a stop, such as by running the driver's license, insurance, and vehicle registration through law enforcement databases to identify any potential issues, such as an expired license, outstanding warrants, or crimes reported associated with the vehicle in question. As discussed elsewhere herein, these documents are pre-configured during setup (203), the data is available digitally and can be provided directly from the officer application (110A) to the databases in question, eliminating the need for the officer (103) to manually transcribe information. This may be done through an API or other integration between the law enforcement application (110A) and the law enforcement database systems.

The provide/exchange information step (203) may further comprise audio, or audiovisual communication between the officer (103) and the civilian (105). For example, a video chat or audio chat session may be established between the officer (103) and civilian (105) in order to facilitate communication. This would allow the officer (103) to visually assess the physical state of the civilian (105), such as to look for signs of intoxication or other impairment, or to look for signs of distress or an emergency such as a health condition or problem.

In an embodiment, during a video chat, facial recognition may be used to identify the portion of the frame containing the civilians face, and the background of the civilian (105) vehicle may be blurred, redacted, or replaced with another image so that the officer (103) does not receive information about the interior of the vehicle that may be private or sensitive, and not otherwise lawfully available to the officer (103). Additionally and/or alternatively, the officer (103) and civilian (105) may communicate via text chat, or another communication technique available on mobile devices.

During any such communication session, the officer (103) may explain the reason for pulling over the vehicle, including the basis for probable cause, and may ask questions and conduct other common field investigation activities that normally be carried out during a traffic stop when the officer (103) is standing next to the vehicle.

After the officer (103) has finished collecting information (213), the officer (103) decides whether to issue a citation or warning (215). If not (216), then the virtual stop is concluded (217), and the civilian (105) departs. An archive of the virtual stop may be stored (219). This may be done both on the civilian device (106) and on the police device (104), and/or may be stored in a remote database (112), typically associated with the server computer (111). The civilian (105) may also have the option of storing an archive of the encounter on the civilian device (106) in order to ensure that the data is not deleted or altered. Additionally and/or alternatively, other confirmatory techniques may be used, such as a checksum, to confirm that it has not been modified.

The archive may store a variety of information about the encounter such as the date and time that it took place, recordings of the audio, video, and/or text chat, copies of documents or other information exchanged, the detected location of the police device (104) and/or civilian device (106) at the time that the respective applications (110) were used. This information also provides an audit trail, which can be compared to the police report to ensure accuracy and completeness.

In an embodiment, this information may also be used to automatically fill out parts of a police report or citation, improving accuracy and reducing paperwork time. For example, the officer application (110A) may use the date and time of the officer device (104) to fill in the date and time of the traffic stop as reflected on the citation. Additionally, the detected location of the officer device (104) may be used to fill in the location where the civilian (105) was detained.

If the officer (103) decides to issue a ticket (218), an electronic copy of the citation may be provided to the civilian (105) via the applications (110), which the civilian (105) can digitally sign (221) to acknowledge receipt. This may be done, for example, by using a finger to sign a touch screen, or enter a typed electronic signature. The signature confirmation may then be digitally provided to the officer (103), and the traffic stop is then concluded (217). In an embodiment, the signed citation may also be digitally provided to the justice system (110).

As discussed elsewhere herein, a common aspect of a traffic stop is the exchange of data between the officer (103) and civilian (105). Civilians operating a motor vehicle are generally required by law to carry certain documents with them while doing so. In an embodiment, copies of these materials may be transmitted to the police application (110A) from the civilian application (110B). This may be done in a very simple and direct matter, such as by using the camera on the civilian mobile device (106) to capture an image of each document, and transmit the image. However, this method may be error-prone and result in poor-quality images that are difficult for the officer (103) to authenticate or review, and it may be more difficult for the officer (103) to detect forged or fraudulent documents.

Figure 3:
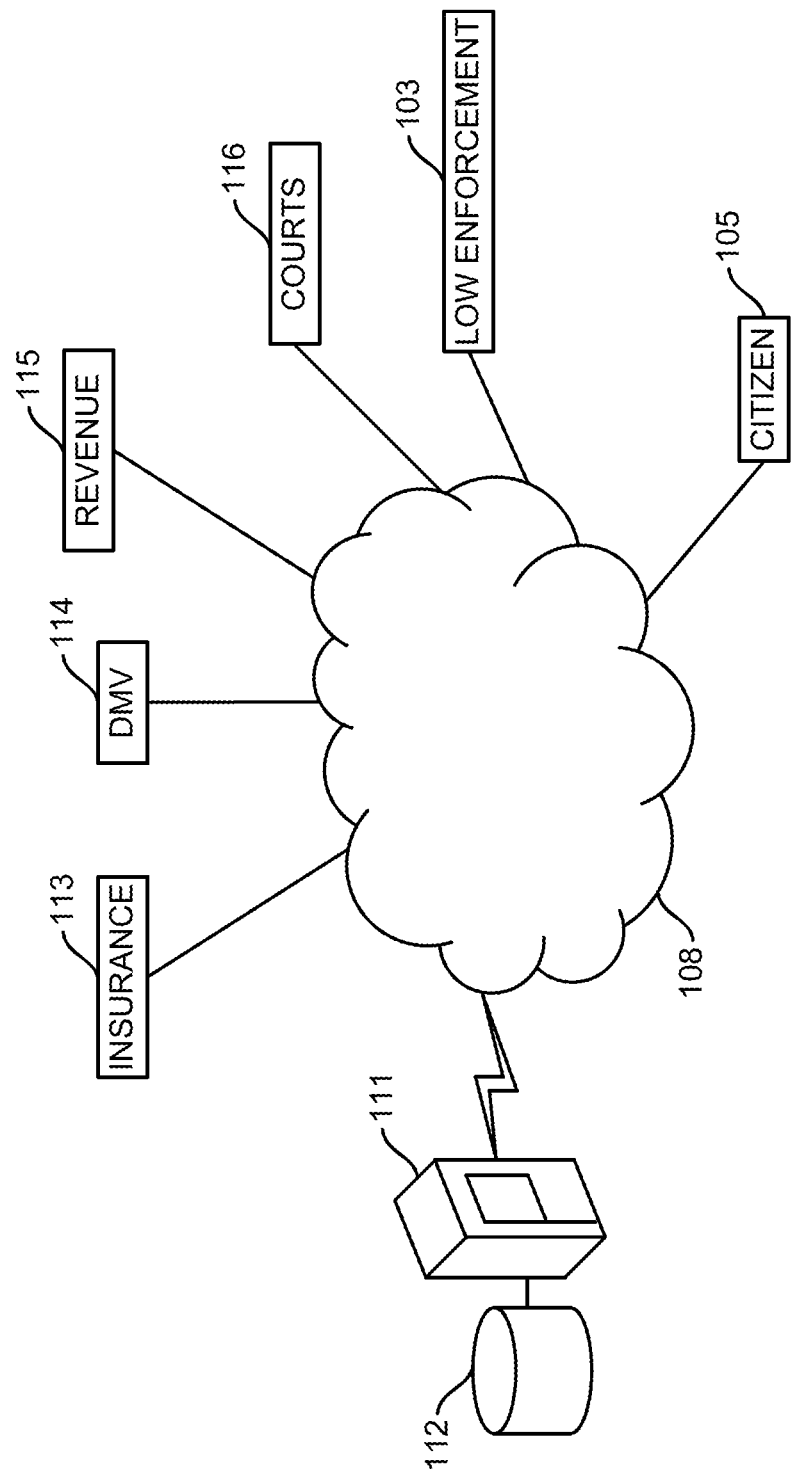
FIG. 3 depicts a schematic diagram of systems and communications that may be utilized in an embodiment of a virtual traffic stop system or method according to the present disclosure.

Thus, in a preferred embodiment, certain documents or information may be authenticated in advance, such as during the civilian configuration step (203). Exemplary embodiments of graphical user interfaces (GUIs) of the civilian application (110B) implementing this functionality are shown in FIGS. 4 through 12. Additionally, FIG. 3 depicts a schematic embodiment showing various different agencies and organizations communicating in this process using a network (108). In the depicted embodiments, the civilian (105) may use the civilian application (110B) to communicate with various third parties, such as, but not necessarily limited to, the civilian's vehicle insurance company (113), the licensing agency that issued the civilian's driver's license (114), the registration agency that registered the civilian vehicle (115), and/or a judicial or court system or department (116), all of which may communicate via the systems and methods described herein.

Figure 4:
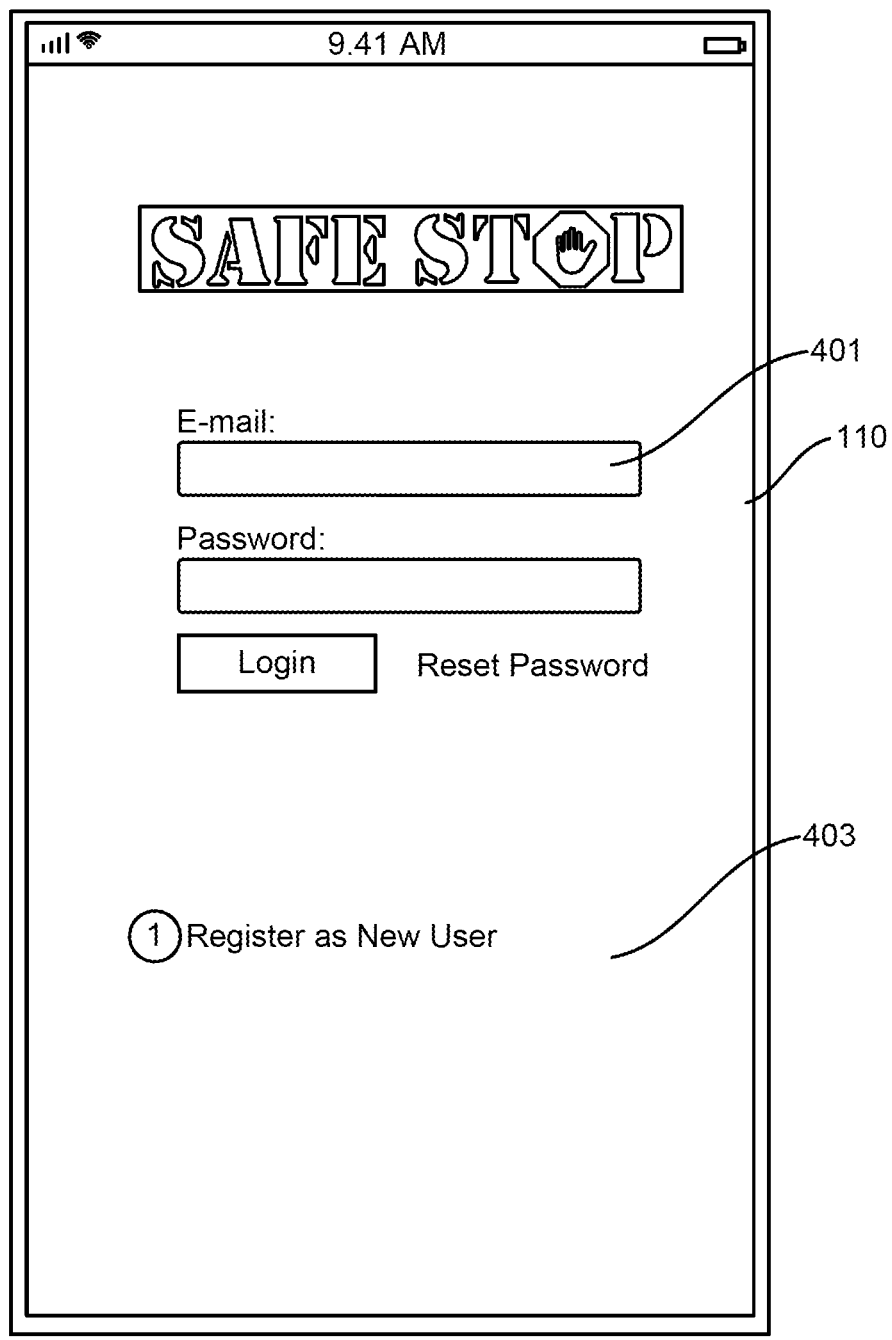
FIG. 4 depicts an embodiment of an authentication screen for a virtual traffic stop application according to the present disclosure.

When the civilian (105) first acquires the application (110B), the civilian (105) may establish authentication credentials. As depicted in FIG. 4, this may be done by registering as a new user (403) or logging in using existing credentials (401). Registration (403) generally involves establishing a civilian profile (501), which may include providing the civilian's (105) first, middle, and last name, and other basic information. The other information may compromise the civilian's (105) contact information, address, phone number, e-mail address, and/or relevant licenses, such as firearms licenses.

This information may be used to validate the identity of the civilian (105) setting up the application. For example, the application may communicate with an agency that maintains birth certificates to confirm the user's identity. Alternatively, a previously verified proof of identification may be utilized to confirm the user's identity, such as a passport. In another embodiment, the user's identity may be identified by sending a confirmation e-mail to a user-supplied e-mail address, or making a nominal charge on a credit card in the civilian's (105) name.

In, an embodiment, the civilian (105) may upload a profile picture, or an official photo from a government-issued identification may be used. All of the information about or supplied by the civilian (105) to set up his or her user account is civilian profile (501) data and may be stared in the civilian (105) device (106) and/or in cloud storage (112), which may be managed and/or accessed via the application server (111) over the network (108).

The civilian (105) may also use a configuration screen to manage various settings in the application, such as updating the civilian profile information, hiding details, altering the profile photo, and configuring receipt of alerts and messages. By way of example and not limitation, the civilian (105) may configure the application (110B) to automatically provide verified documentation to an officer (103) during a virtual stop, to only send the specific documentation requested (110B), or to provide information only manually.

Likewise, the setup process (203) may include an officer setup process (203). When an officer (103) sets up the officer application (110A), the officer (103) may provide profile information, such as, but not necessarily limited to, a photo, badge number, employing municipality or entity, department, dispatch office number, supervising officer, and other information. When an officer (103) registers as a new user, generally, it is expected that the officer's department, or another authority, will confirm or authorize the officer's (103) account to complete the registration process and confirm that the officer (103) is in fact employed, not suspended, and currently authorized to engage in law enforcement activity. The authorizing agency or user may be thought of as having a superuser role with respect to the officers working for it.

Figure 5:
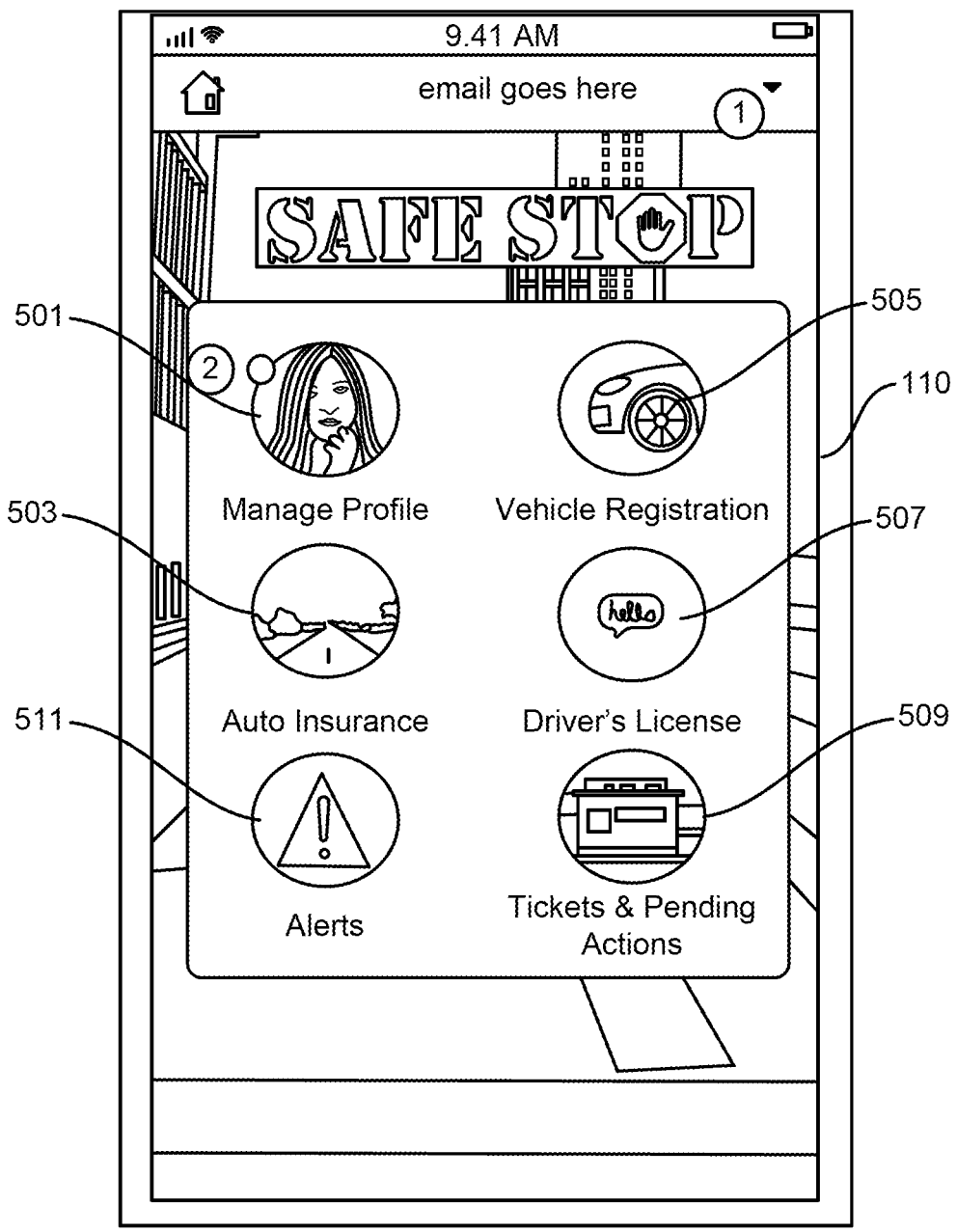
FIG. 5 depicts an embodiment of a home screen for a virtual traffic stop application according to the present disclosure.

The user, whether officer (103) or civilian (105), may configure the application (110) by navigating through one GUIs. An exemplary embodiment of one such GUI is shown in FIG. 5. In the depicted embodiment of FIG. 5, the interface provides options for managing a civilian profile (501), configuring the auto insurance information (503), configuring the vehicle registration information (505), configuring the driver's license information (507), managing tickets and pending judicial actions (509), and checking alerts and notifications (511). The civilian (105) may navigate to various parts of the application (110) using the GUI.

Figure 6:
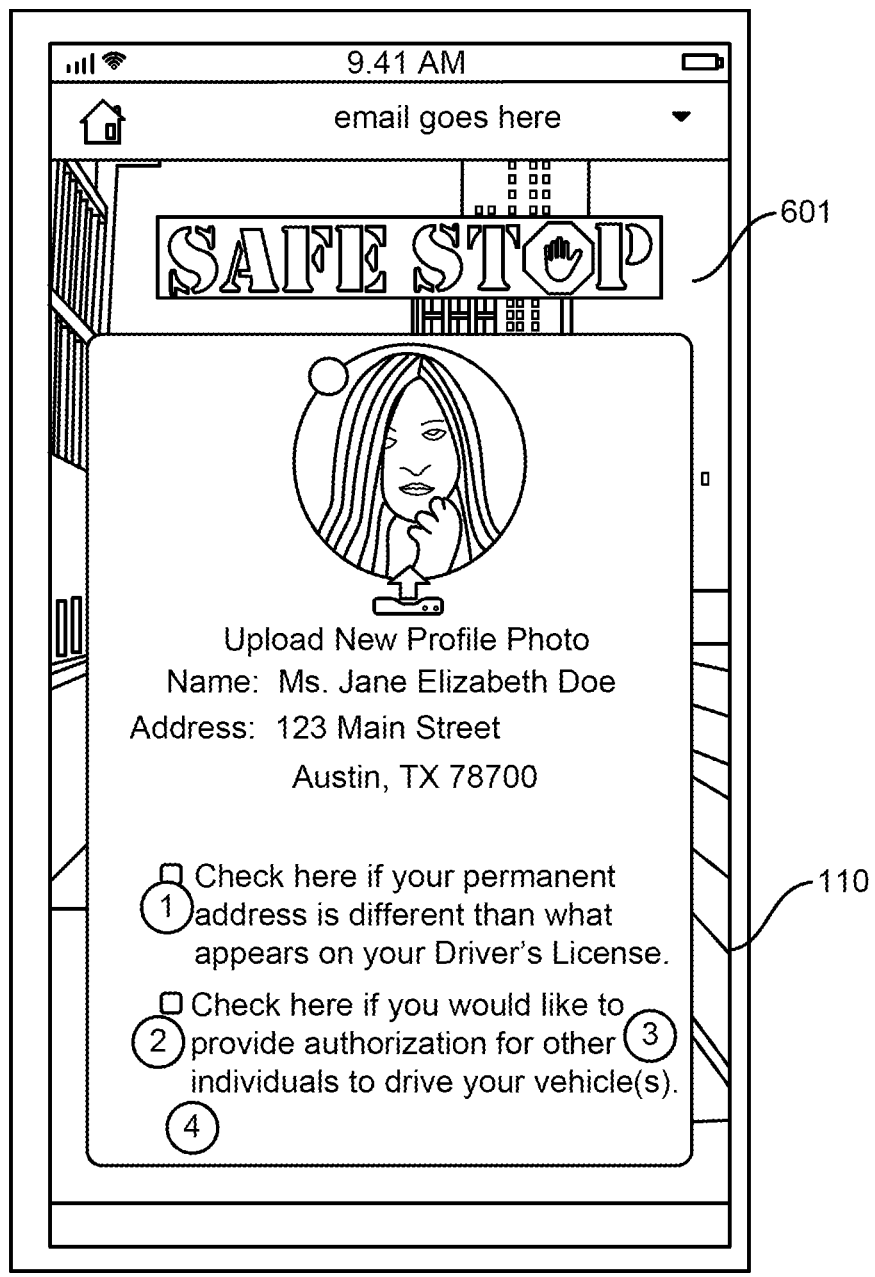
FIG. 6 depicts an embodiment of a profile screen for a virtual traffic stop application according, to the present disclosure.

The depicted manage profile page (601) in FIG. 6, provides the ability to add or copy the photo, name, address, or other profile information or configuration details, including managing any payment terms associated with a subscription to the application or related services. The profile page (601) may also provide a visual indication of whether the civilian (105) has been fully verified, such as circle as shown in the depicted embodiment of FIG. 6. This verification of status may also appear elsewhere in the application (110) and be provided to an officer (103) in event of a virtual stop. This helps the officer (103) to assess whether to conduct a virtual stop or a conventional stop.

This visual indication may also be used to indicate whether other information has been provided and verified. For example, in an embodiment, the application (110) may display a different visual indication for each of the different documents that have been submitted and verified by the civilian (105), such as a green check for documents that are verified and a red X for those that are not. The profile page (601) can also be configured to manage additional information not depicted in the exemplary embodiment. For example, name changes and other details may be provided.

In an embodiment, the setup process (203) may include the ability to add and configure an authorized driver. This feature could be associated with the vehicle or vehicles registered via the application (110B) in association with the verified civilian (105), and could provide for other individuals to be authorized to use the registered civilian's (105) vehicle at certain days or times on a temporary basis. This has the advantage of providing the officer (103) with information that the driver of a given vehicle may be somebody other than the registered owner, and that this person is in possession of the vehicle with the registered owner's knowledge and consent. This may reduce misunderstandings that could lead to an avoidable confrontation.

In an embodiment, the additional authorized users may be identified by the registered civilian (105), such as by providing the authorized driver's cellphone number or e-mail address. This can be done by sending the authorized user a code to provide to the officer (103), or to et into the authorized user's own application to add the vehicle in question to the authorized driver's application. In this way, a verified vehicle can be established by a first user, and then permission to use it granted by that user to a second user, and then the verified vehicle may be added to the second user without the second user's account having to also verify the vehicle.

In an embodiment, the civilian's (105) weapon licenses may also be part of the profile data or other configuration. For example, if the civilian (105) is authorized to conceal- or open-carry a firearm, this information may be verified with the appropriate licensing agency and included in the user profile (601). Likewise, the civilian (105) may indicate in the application whether he or she is presently carrying a firearm. This information may be provided to the officer (103) during a virtual stop to help assess the situation, which may also reduce misunderstanding and escalation.

Figure 7:
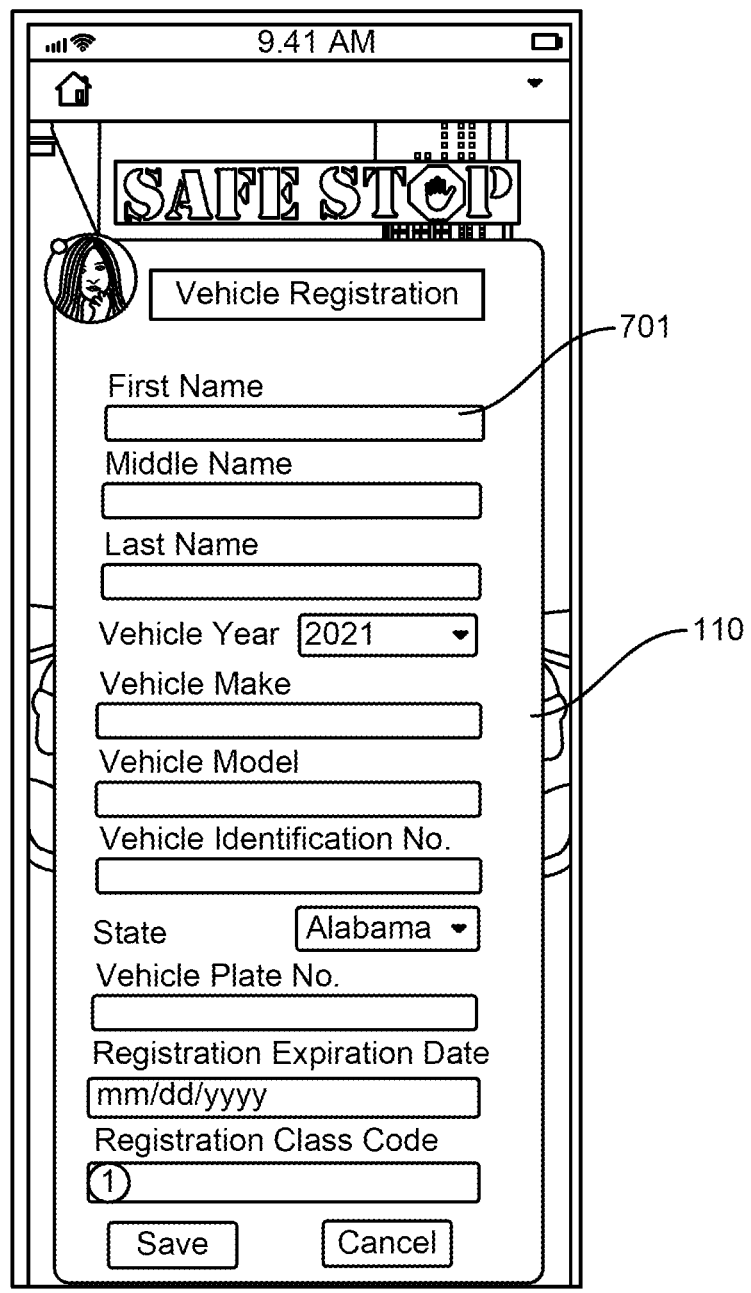
FIG. 7 depicts an embodiment of a vehicle registration screen for a virtual traffic stop application according to the present disclosure.
Figure 8:
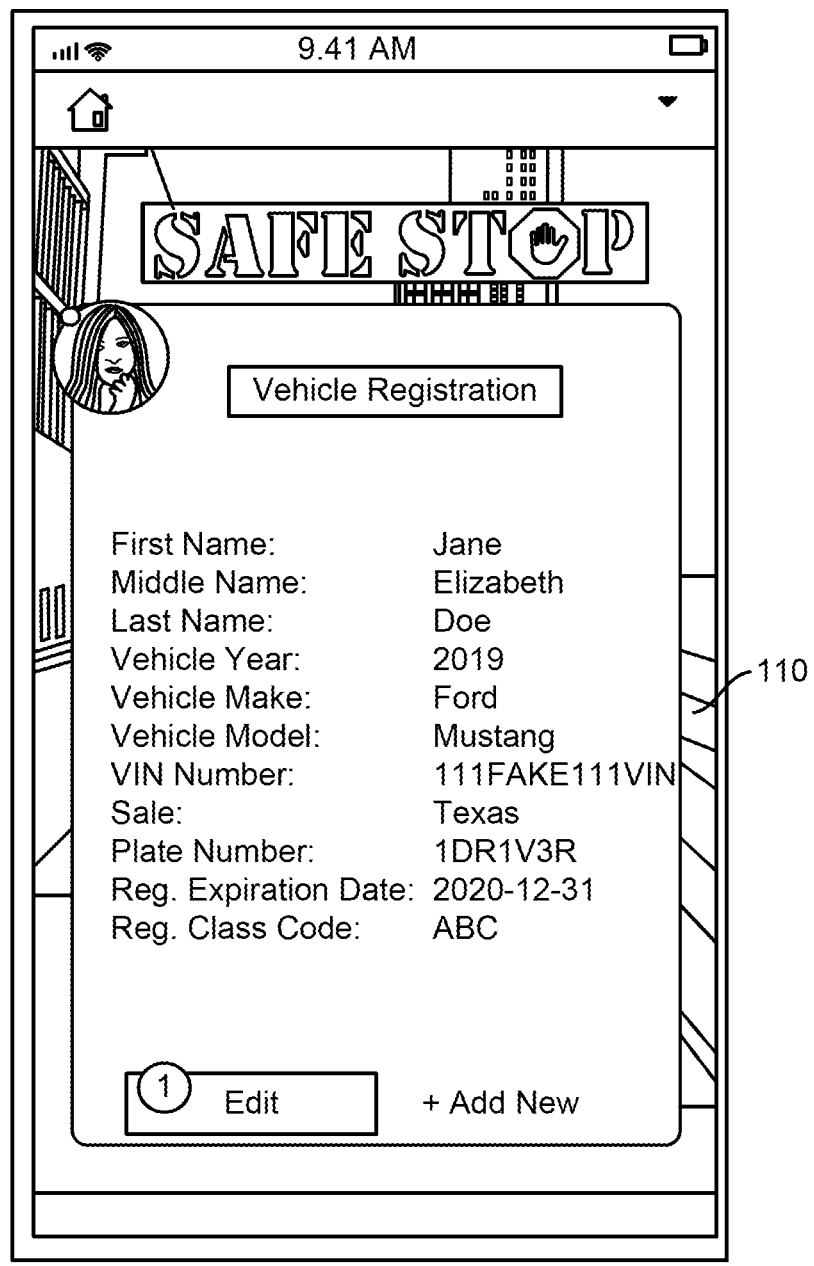
FIG. 8 depicts an additional embodiment of a vehicle registration screen for a virtual traffic stop application according to the present disclosure.

In an embodiment, the setup process (203) comprises a vehicle registration configuration. FIGS. 7 and 8 each depict an embodiment of such a vehicle registration graphical user interface. FIG. 7 depicts a form for entering basic information about the vehicle and the registered owner, and FIG. 8 depicts a completed form. In an embodiment, the civilian (105) provides basic information required to identify and confirm ownership of the vehicle in question, such as the vehicle identification number (VIN), license plate number, and make, model, and year.

The civilian application (110B) may communicate with the appropriate registration agency, such as a department of motor vehicles (114) and/or a department of revenue (115), to confirm a valid registration. Depending upon the particular organizational structure of any given government, other departments may be involved. For example, in an embodiment, the information supplied by the civilian (105) may be automatically sent to the appropriate departments for confirmation via the network (108). If that confirmation is received, then the vehicle is considered registered and confirmed in the application. If not, the vehicle data is retained, but the registration is not yet confirmed.

Figure 17:
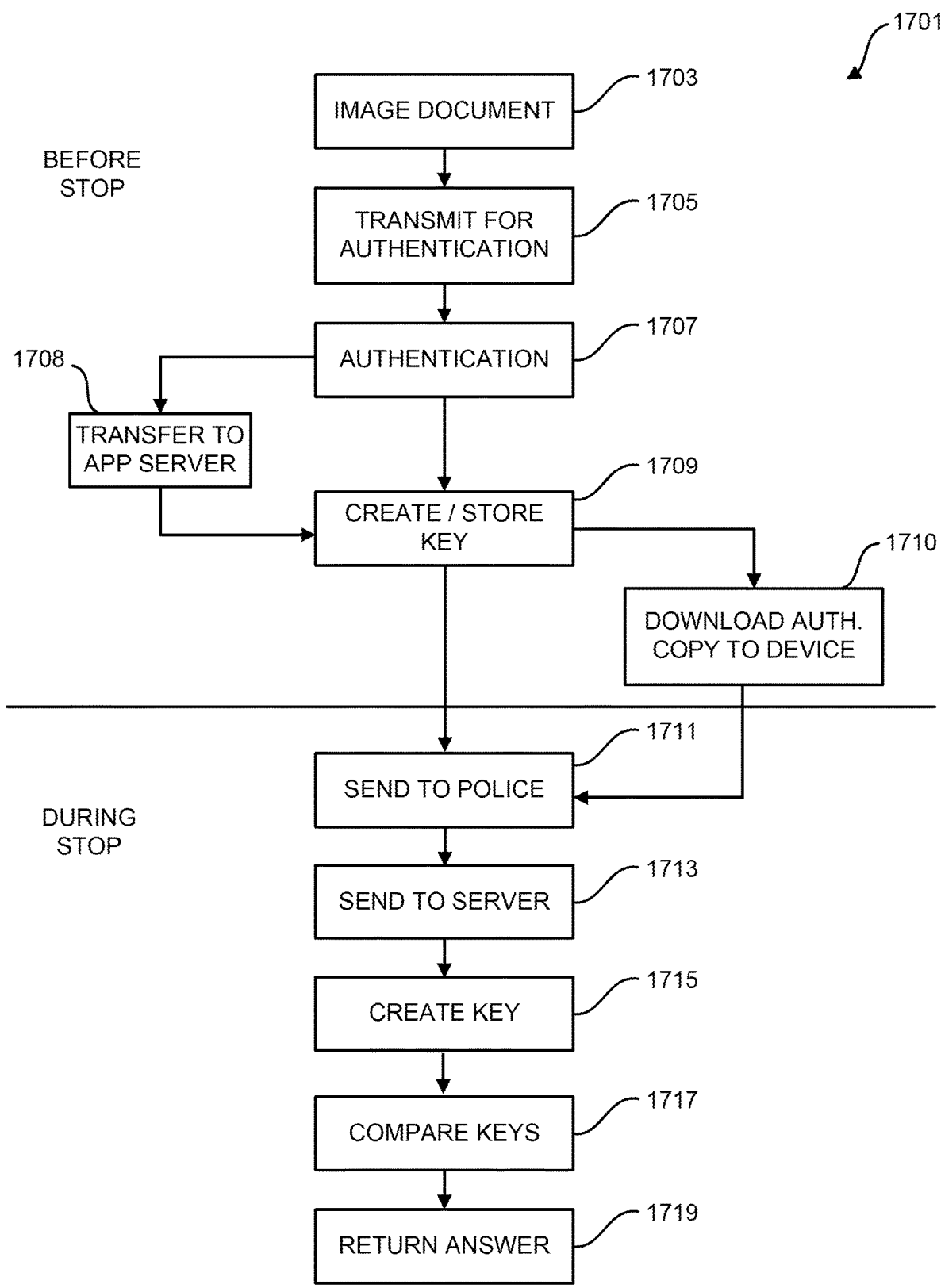
FIG. 17 depicts an embodiment of one way to facilitate the confirmation or verification of information (such as vehicle registration) to be exchanged during an event (such as a virtual traffic stop) in a civilian application.

There are a number of ways to facilitate the confirmation or verification of the information in the civilian application (110B), one of which (1701) is depicted in FIG. 17. The process ordinarily involves the issuing agency for the document authenticating the document in advance, and then providing a unique key, checksum, or other code or data, which, during a stop, can be independently verified by the police to confirm authenticity.

By way of example and not limitation, when the civilian verifies a vehicle registration, the vehicle registration agency may provide a secret key or unique identifier or code that is stored on the user device (106), and/or stored at an application server (111), and/or retained by the department in question. This secret key or code may bear a relationship to the content of the authenticated document. During a stop, a copy of the authenticated document, and the code, may be provided by the civilian application (110B) to the officer application (110A), and the officer (103) may then provide that copy and code to verification server, such as the application server (111) or an agency server which will confirm whether the document and code match official records.

By way of example and not limitation, suppose the civilian wishes to verify a copy of his or her vehicle registration. The civilian can use the camera on the civilian device to capture one or more images (1703) of it (e.g., front and back sides) and use the application (110B) to transmit (1705) copies of those images to the relevant government agency for verification. The agency then verifies (1707) that the image data accurately represents the vehicle registration document, and generates (1709) a key or code based on the image file data, such as a checksum. This may be done by the agency itself and the resulting key provided to the application server (111) for storage (1709) in association with a copy of the authenticated document, or it could be done by the agency transmitting (1708) a copy of the authenticated document to the application server (111) to perform (1709) a checksum and store (1709) the document and resulting key.

Other techniques may also be used, particularly in circumstances where the agency does not support a direct electronic communications channel with the application (110B). For example, the civilian could simply request that be agency send an official copy of the document in question directly to a service provider managing the application server (111), which could then image the document and create the checksum in association with the civilian (105)'s account or authentication credentials. Once done, a copy of the imaged document is then downloaded, possibly automatically, to the civilian application (110B) as a "verified" document.

During a stop, the officer (103) requests proof of vehicle registration, and this image data is transmitted (1711) to the officer application (110A), which then sends (1713) a copy to the application server (111), potentially along with identifying information to assist in looking up the checksum for the document in the application server (111) database (e.g., an identifier for the civilian or document). The application server (111) can then perform (1715) the same checksum on the document content and compare (1717) the result to the stored checksum to determine if they match, if the key matches, the copy received by the officer (103) is confirmed as being identical to the copy authenticated by the agency. If not, then the content of the document has changed in some fashion acid the application server (111) is unable to confirm that the copy received by the officer (103) is identical the copy authenticated by the agency. The result is then returned (1719) to the police device. This same process may be utilized for proof of insurance, driver's license, or any other data file.

These and/or other techniques for verifying the authenticity of the data on the civilian device (106) may be used in an embodiment. Some techniques do not require a checksum at all, but rather perform the same essential steps, but an algorithm is used to compare the visual similarities between the copy received by the officer and a verified copy on file with the applicable agency server or application server (111). If the visual similarity is within a predefined threshold, the copy received can be confirmed as authentic even if the underlying binary data does not match. This can happen where the document is changed in some manner that does not materially alter the visual content, such as resizing and changes to metadata, document format, or byte order.

The particular data and process for verifying any particular vehicle registration may vary front jurisdiction to jurisdiction depending upon particular rules and regulations of the registration divisions of each state, and the technological capability of each agency.

In an embodiment, the civilian (105) may register multiple vehicles. Additionally, in an embodiment, a civilian (105) may not own a vehicle, but nevertheless wish to use the application (110B). In this situation, the civilian (105) can indicate that there will be no vehicle registration data.

Figure 9:
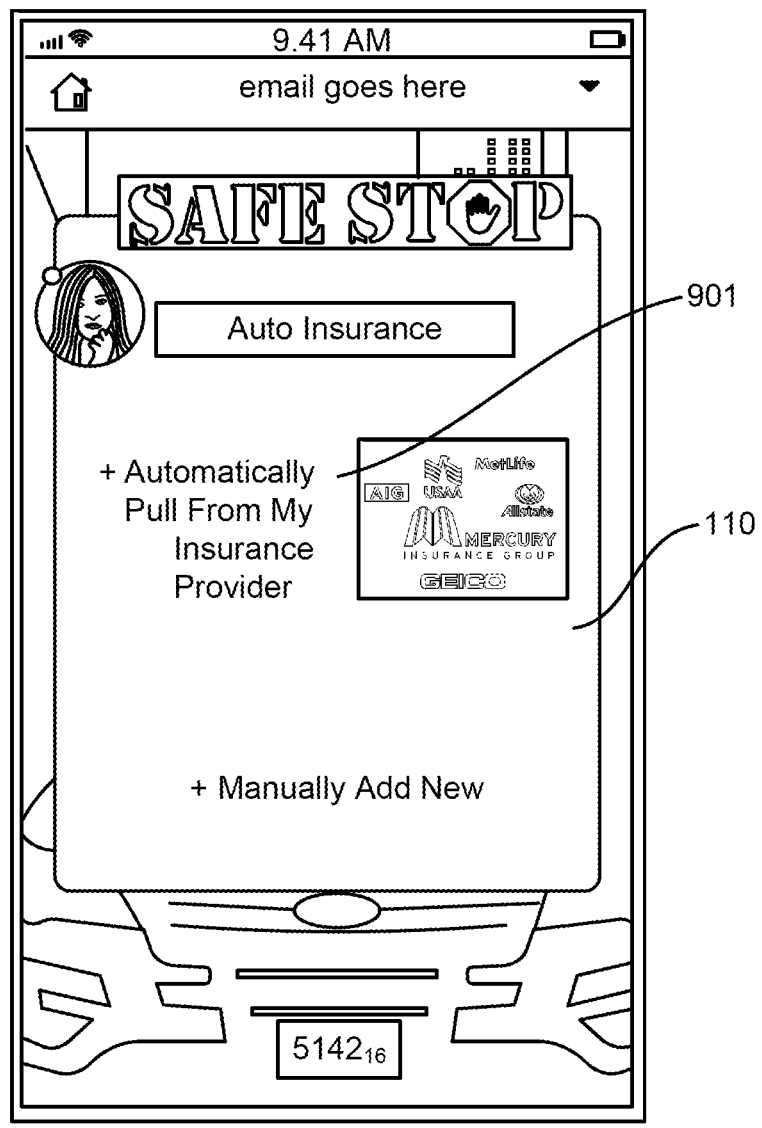
FIG. 9 depicts at embodiment of an auto insurance screen for a virtual traffic stop application according to the present disclosure.
Figure 10:
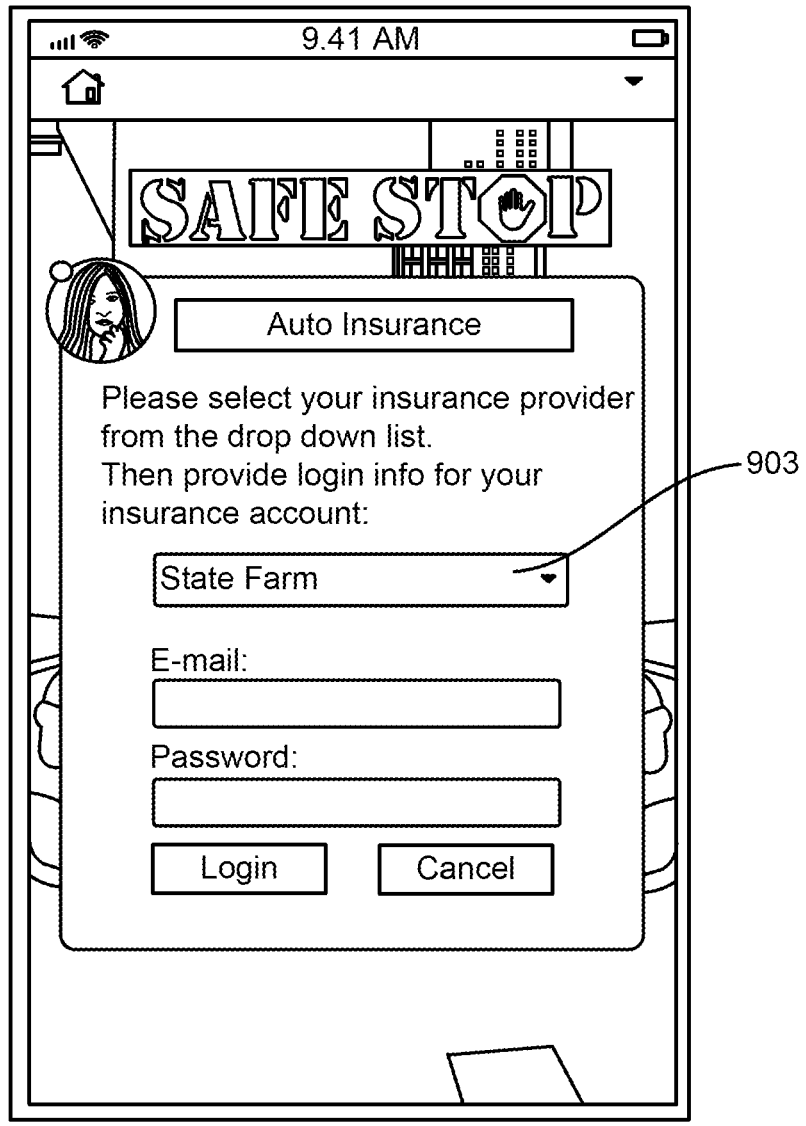
FIG. 10 depicts an additional embodiment of an auto insurance screen for a virtual traffic stop application according to the present disclosure.

In an embodiment, the setup (203) process comprises verifying proof of insurance. FIGS. 9 and 10 depict embodiments of interfaces (901) and (903) for verifying proof of insurance on the vehicle. This process may be carried out in much the same way as providing proof of vehicle registration. The user (109) may be presented with an interface for entering the basic identifying information for the policy. Once entered, the application (110B) may contact an insurance company via the network (108) to verify the information. Alternatively, the user may automatically insurance information by providing the user's authentication credentials for an online insurance portal. Again, known techniques for verifying the authenticity of this information may be used.

Figure 11:
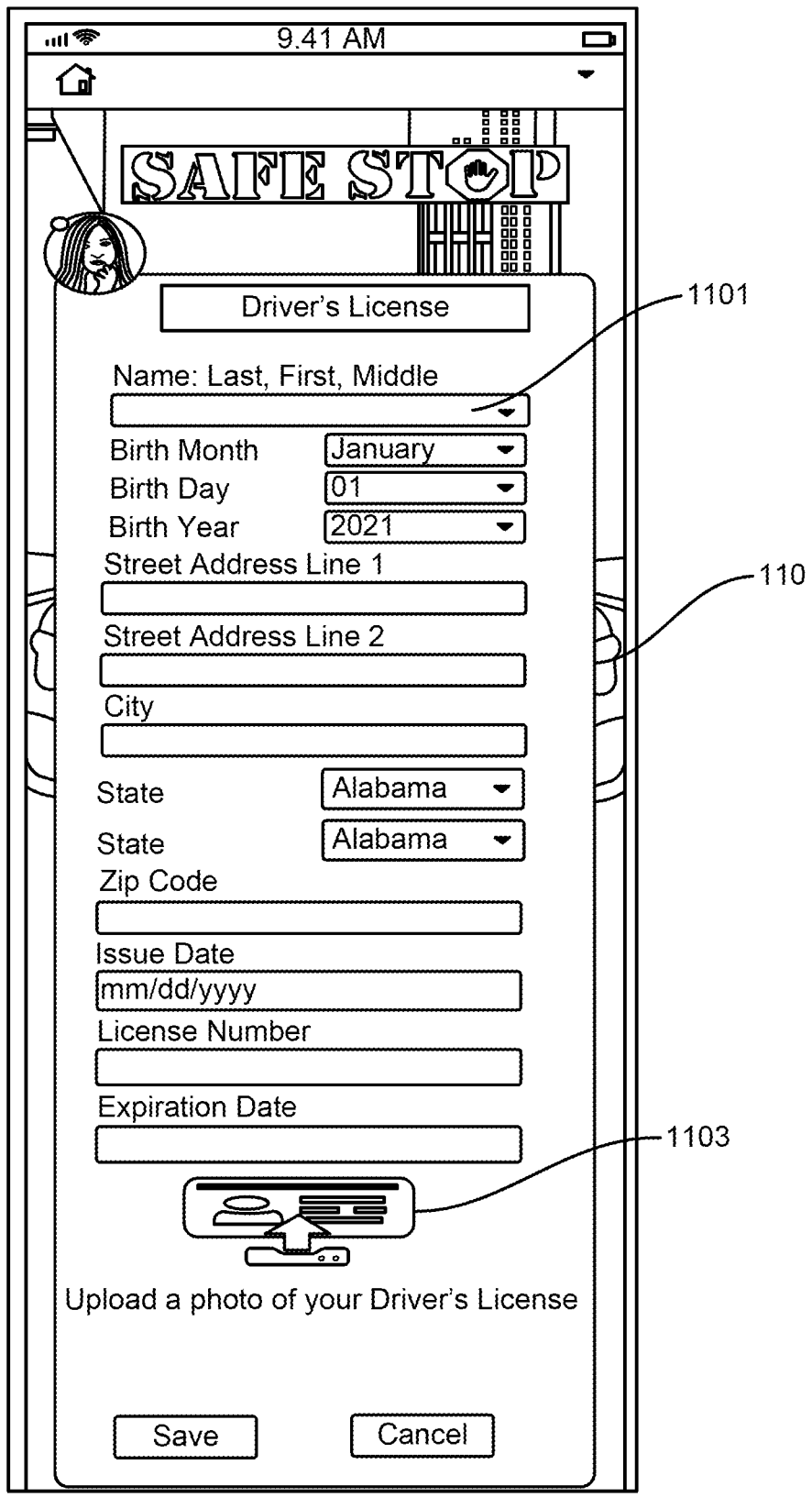
FIG. 11 depicts an embodiment of a driver's license screen fir a virtual traffic stop application according to the present disclosure.
Figure 12:
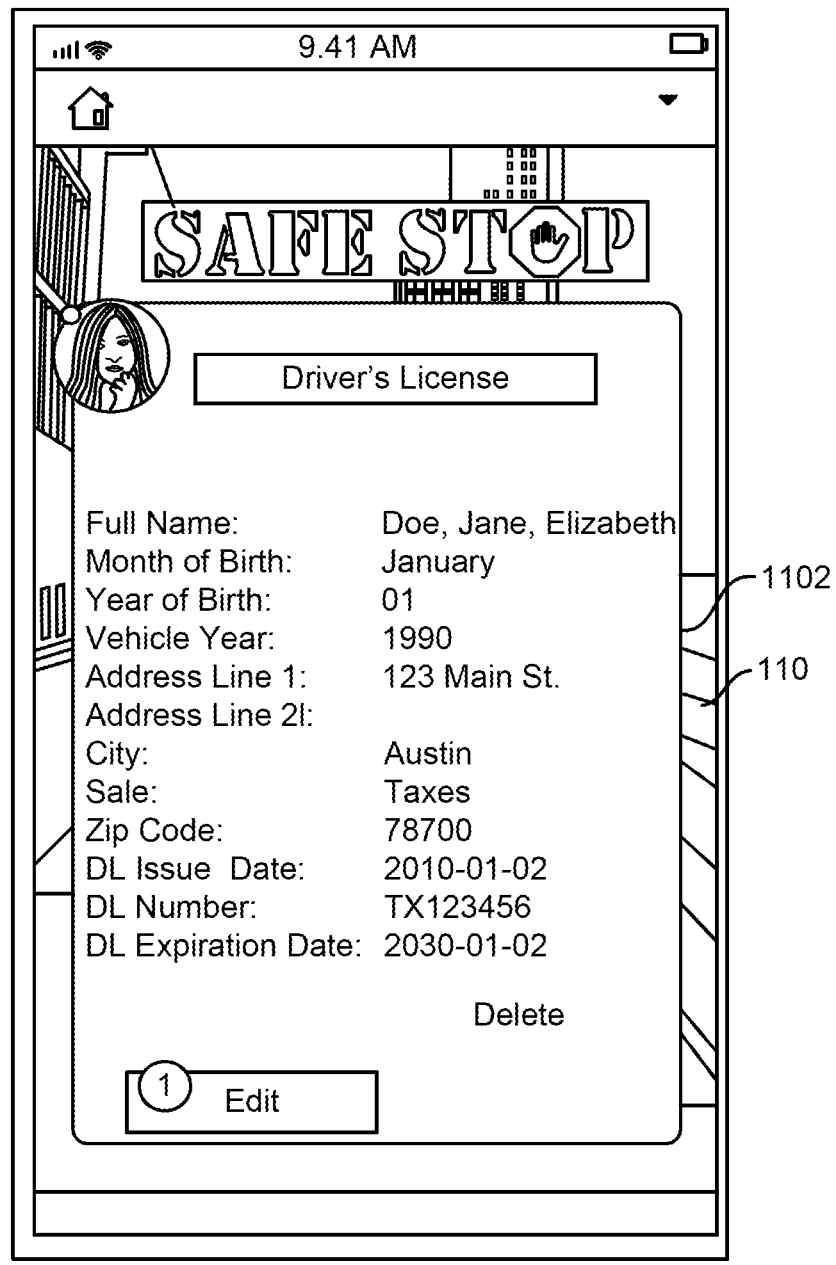
FIG. 12 depicts an alternative et embodiment of a driver's license screen for a virtual traffic stop application according to the present disclosure.

In an embodiment, the setup (203) process comprises verifying the civilian's (105) driver's license information. FIGS. 11 and 12 depict embodiments of interfaces (1101) and (1102) for providing and managing this information. This process works generally similarly to vehicle registration and insurance. The civilian (105) provides the basic information required to look and confirm the license information. The system may then contact the licensing agency to confirm that the information is correct, the license has not been suspended or revoked, and is not expired. Additionally, and/or alternatively, the civilian (105) may use the camera built into the mobile device to take a photo of the driver's license, and optical character recognition may be used to identify and populate the relevant fields, simplifying the process. This step technique may also be used to scan a vehicle registration or paper insurance card in the respective setup for vehicles and insurance.

In an embodiment, the setup (203) processes may provide the application with information about dates related to the registration, license, or insurance. For example, once the civilian application (110B) is set up and configured with insurance, vehicle, and license information, various key dates, such as the expiration of the vehicle registration, driver's license, and insurance policy, are all known and may be used to provide the civilian (105) with alerts or reminders in advance to take appropriate action to renew these documents as necessary. These alerts may be provided via the alerts page, by text or e-mail by push notification, or otherwise in a manner that is known in the art.

In an embodiment, the civilian application (110B) may further comprise functionality and associated GUIs for viewing and managing previous citations, and their current status. This may include identifying the court appearance date on a citation, and providing appropriate alerts to the civilian (105). The application may also contain preprogrammed information about local rules for courts, including instructions, dress code, process, and contact information for the clerk, prosecutor's office, and the like.

In an embodiment, the civilian (105) may have the ability to pay the citation without the need to appear. For example, the civilian (105) may provide credit card information and charge the card for the amount of the fines and court fees. This may all be done at the traffic stop itself if the civilian (105) does not wish to contest the citation, or, it may be done later.

In an embodiment, the civilian application (110B) may include functionality for reviewing the stop, such as replaying any audiovisual or audio content. Any user may have the ability to review the date, time, and location of the offense. The user may have the ability to view a digital copy of the citation, which may include hyperlinks to the violated statute or code section in question. The application may contain details about the officer (103), including the name and badge number. The application (110) may provide the ability to download or e-mail a digital copy of the citation, such as for printing. The application (110) may provide the ability to directly pay the citation through the application (110), such as by providing a credit card. Alternatively, in an embodiment, the application (110) may provide the ability for third-party administrators to offer payment plans for citations, by which the third-party administrator pays the citation, and then receives payments front the civilian (105) over time, generally with an applied interest rate. This allows civilians (105) who are short on cash tip to promptly pay their tickets, without potentially losing access to their vehicle or license, which often puts the ability for generate income in jeopardy.

In an embodiment, the application (110) is connected to a court scheduling system. In such an embodiment, the civilian (105) may be notified of available court dates, or may confirm availability for those court dates. Alternatively, the civilian (105) may provide availability for court dates and be automatically scheduled for an appropriate date. In an embodiment, the alert systems provides an alert or reminder for the court date, including time and location details, as well as case information such as docket number, case number, and the commonly charged fines associated with the citation, if any. Much of this information is also available to the officer (103), as well as to other users in the law enforcement agency. For example, the officer (103) and law enforcement agency may be able to review information about the ticket and the stop, as well as associated court dates, where the officer (103) may be required to appear and testify.

Other information may also be made available to the application (110), such as warrant status, such as any new, removed, or rectified warrants, warrant history, license suspensions, including date of suspension and restoration, and any special limitations on driver's licenses, such as permission to drive on a suspended license during work hours, hardship exceptions, or limitations based on physical disability, such as time of day limitations or speed limitations. This information may also be available to the civilian (105) or the officer (103)/law enforcement agency.

In an embodiment, the systems and methods may be programmed to conduct specific types of traffic stops remotely. For example, a common technique administered by police officers when a driver is, suspected of being intoxicated is to issue a field sobriety test. However, intoxicated drivers can sometimes become belligerent and difficult and, following the COVID-19 global outbreak, the need for contact less or socially distanced procedures is heightened.

To that end, an embodiment may include a virtual field sobriety test feature. In such an embodiment, the application may be programmed with a "game" which is essentially a test of driver impairment, which provides officers with information that is helpful in assessing whether a driver is intoxicated.

Figure 13:
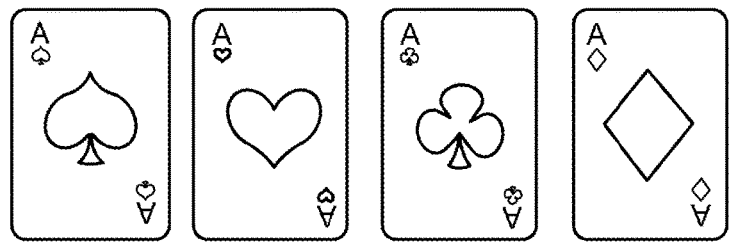
FIG. 13 depicts an embodiment of a virtual field sobriety test according to the present disclosure.
Figure 13:
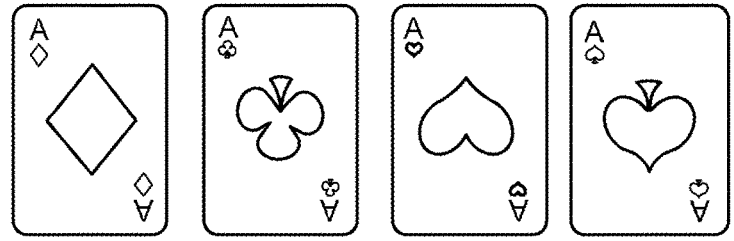

By way of example and not limitation, FIG. 13 depicts an example of an image matching assessment to assess the vision, judgment, concentration, and reaction time of the driver. In such an embodiment, the officer (103) would provide an indication via the officer device (104) that the officer (103) desires to conduct such a test. The civilian (105) would then be presented with the opportunity to participate in the test on the user device (106). The user may, of course, decline, in which case ordinary police protocol is followed for the circumstance of field sobriety test.

In an embodiment, the image matching test may require the user to select an image from two rows of related images, and then match that image with the corresponding image in the second row. Such an embodiment is depicted in FIG. 13. This test would be timed, and the timing would be provided to the officer (103) to assess the driver's concentration and reaction time. In this embodiment, after the driver selects one card from the first row, that row disappears, and the driver then has to select the matching card from the second row. This requires the driver to recall the image that was previously selected, and then to promptly make a second and identical selection. This second selection may be required to be made before time elapses. Test simulations and the arrangement of images presented typically will be randomly generated. This test may be repeated several times in order to get a reasonable sample size. This test may be referred to as, for example, "Sobriety test example A, matching image assessment".

Figure 14:
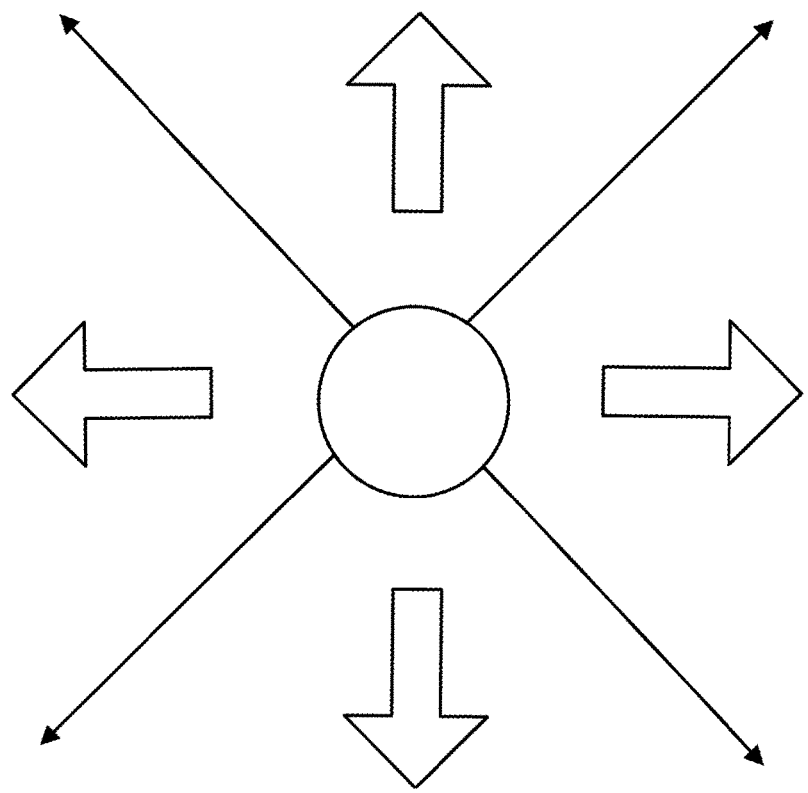
FIG. 14 depicts an embodiment of a virtual field sobriety test according to the present disclosure.
Figure 15:
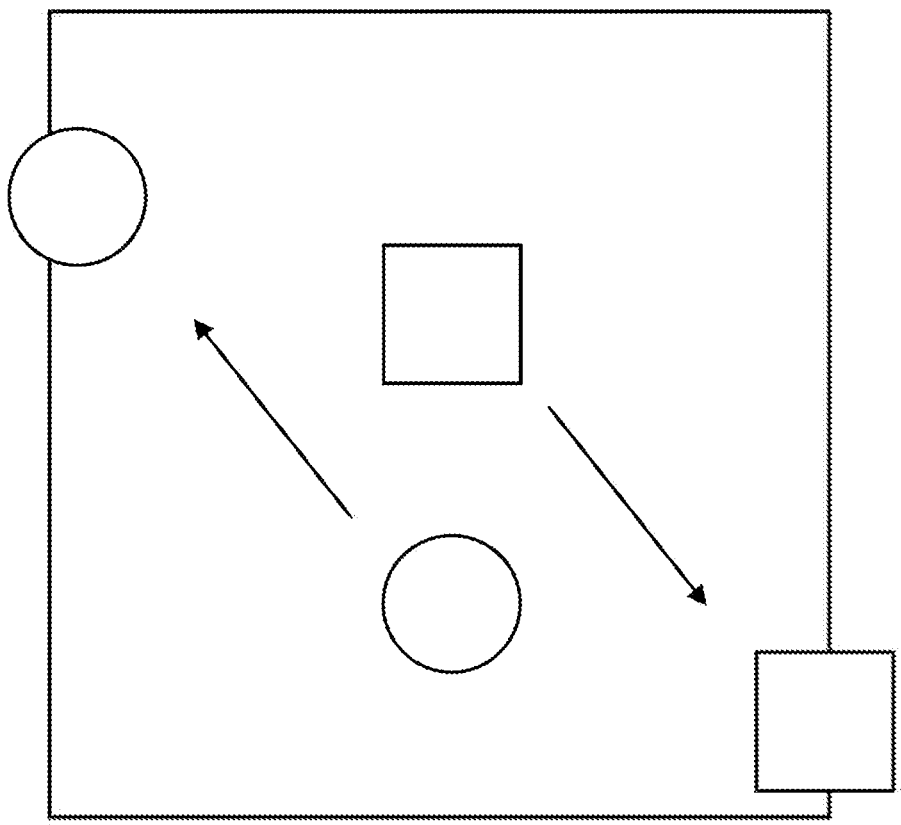
FIG. 15 depicts an embodiment of a virtual field sobriety test according to the present disclosure.

FIG. 14 depicts an alternative embodiment of virtual field sobriety test, referred to as a moving image assessment. In this embodiment, various shapes would appear on the screen of the driver. When the test begins, the shapes begin to move in any one of several directions, generally moving towards the edge of the screen to exit the view. The driver is required to select all of the objects in motion before they fully exit the display. In the depicted embodiment, the shapes that appear on the screen may move any of the directions indicated by the depicted arrows, or in a combination of the directions indicated. Again, this test assesses vision, judgment, concentration, coordination, and reaction time. FIG. 15 depicts an alternative embodiment of a field sobriety test using a moving image assessment. In the depicted alternative embodiment, two shapes, a circle and a square, move diagonally across the test subject's screen. To pass the test the objects must be selected before they exit the screen and within the time allotted for the test.

In an embodiment, the field sobriety test is conducted while the users camera is activated, allowing the officer to assess the user's demeanor and appearance while conducting the test. This allows the officer to assess the horizontal and vertical gaze nystagmus test commonly taught at law enforcement academies and used in jurisdictions nationwide to assess driver impairment.

In an embodiment including a virtual field sobriety test function, facial recognition and/or framing may be implemented to indicate the distance the civilian (105) should hold the phone for a clear and usable image for the officer (103). For example, a profile or outline of a head may be provided in the frame to indicate to the an (105) to hold the camera or further away until the civilian's roughly fits the profile. Visual indicators or instructions may be provided as well.

In an embodiment, the interactive aspect of the application (110) may include a pause, or automatic pause function. The pause function would pause the image and/or audio stream for the civilian (105) or officer (103) based on the unilateral choice of either. This may be helpful for the civilian (105) or officer (103) to have a separate, private conversation, but without ending the session. This feature may be automatically enabled if a phone drop is detected by either the civilian (105) or officer (103). A phone drop may be detected by use of the internal accelerometer or other measuring device within the phone, which can be leveraged it the applications (110) to detect a dropped phone and automatically pause the session. People often panic when dropping a phone, and a drop may be misunderstood as an indicator of nervousness, anxiety, or even impairment. Thus, the auto pause function may be particular important in a field sobriety test to prevent clumsiness as being misunderstood as impairment. Also, the automatic pause may be helpful to reduce the chances of escalation, particularly if an officer (103) drops a phone, which could be construed by the civilian a sign of heightened tension or imminent aggression.

During a field sobriety test, the officer application (110A) to ay provide additional information that is not shown to the civilian in the civilian application (110B). This information may include the amount of time that has lapsed since the field sobriety test began (i.e., a mm: ss display).

Other information may also be made available to the officer through the application, such as biometric data that may make it easier for the officer to assess impairment. This may include heartrate data collected by a biometric monitoring device, such as (but not limited to) a smart watch, fitness tracker, blood sugar monitor, or other biometric device, and other biometric data that is made available to the application through various data sharing settings. This may help the officer (103) observe if the civilian (105) is calm and relaxed, or feels threatened or anxious, and may also alert the officer (103) to a potential medical emergency or other impairment of the civilian (105), which can give the officer (103) additional lead time to call for first responders. Additionally, if the civilian (105) appears healthy but is experiencing heightened heart rate, the officer (105) can apply de-escalation techniques to reduce any tension or anxiety and maintain a sense of calm and routine to prevent escalation.

Other biometric data might be available which could also help the officer (105) accurately assess the situation. This data may be an identification of medical conditions of the civilian (105) that is entered into the civilian application (110B), such as during setup, or may be biometric data collected by medical devices carried or worn by the civilian (105).

For example, a diabetic experiencing low blood sugar can experience symptoms that can be easily mistaken as inebriation, including slurred speech, clumsiness, inability to concentrate, and slow reaction time. The civilian application (110B) could include the civilian profile data an indication that the civilian (105) is diabetic, and provide that indication to the officer (103). Also, if the civilian (105) has a blood glucose meter, current or recent readings could be provided to give the officer an idea or whether the civilian (105) may be experiencing hypoglycemia. Other medical conditions that may influence an officer's (103) decision-making process and how he or she approaches a given encounter include pregnancy, mental illness, heart conditions, prior stroke, behavioral disorders, autism, and so forth. Any medical condition which could, under the sometimes heightened tension of a police encounter, be misunderstood as a refusal or failure to comply with police instructions, could help the officer (103) understand how to approach the encounter, and possibly call for other appropriate services if needed, such as emergency medical services or a social worker. In an embodiment, biometric and other sensitive personal information or data may be shared with the officer only if the civilian (105) allows it, such as through data sharing settings in the operating system and/or the civilian application (110B) and/or third party applications that collect and track such data.

In an embodiment of a field sobriety test, the data collected may be automatically assessed and a pass fail grade assigned and presented to the officer, or a statistical analysis performed to compare the data to prior cases and provide an estimate of the likelihood of impairment. For example, a database of prior virtual tests may be maintained (possibly on an anonymized basis to protect individual privacy) reflecting the observed characteristics of various civilians who have previously performed the field sobriety test, including response time and interaction with the game(s), and facial data. This information can be analyzed and correlated with outcomes in particular cases (e.g., measured blood alcohol levels) to develop the ability to predictively categorize new sets of data and estimate the corresponding blood, alcohol level, or simply the likelihood that the data set indicates a blood alcohol level above or below the lawful limit. The results of this analysis may be provided to the officer (103) at the conclusion of the field sobriety test as a suggestion of what the data indicates, which may help to confirm the officer's (103) interpretation, or may contradict it and cause the officer to conduct a second test, or even to perform a conventional traffic stop. This information can also be made available to the civilian in an embodiment.

Figure 16:
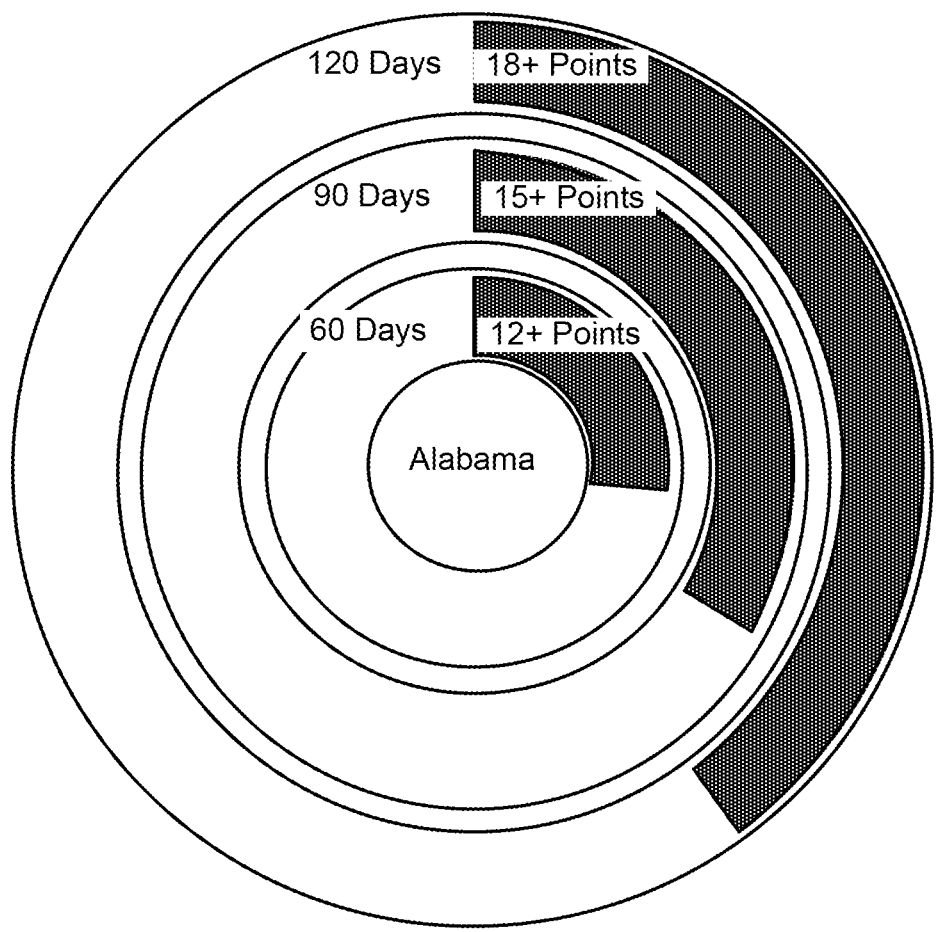
FIG. 16 depicts an embodiment of a visual indication of license points according to the present disclosure.

In an embodiment, the systems and methods may provide other features as well pertaining to traffic stops and the associated legal procedures. For example, the application could display to the civilian the current number of points on the driver's license for prior infractions. An exemplary embodiment is depicted in FIG. 16. This could be done in any suitable format based on the particular point system used in each jurisdiction. This indication could also be color-coded to "grade" the status of the license (e.g., green, yellow, or red, reflecting how close to a license suspension or other legal penalty the driver is). The visual indication may also reflect applicable timing; e.g., how long until prior infractions age off the license and are no longer included in the point calculation. This feature could not only provide drivers with up-to-date information, but be useful to legal counsel to quickly assess the current status of the client's license without extensive research. The app might also suggest helpful information of services based on the number of points such on the license, such as offering defensing or remedial driving courses to reduce or remove points.

In an embodiment, the verification features may be used to authenticate other types of legal documents. These and other verified legal documents stored in the application could be used as a digital version of the actual legal document. For example, the civilian (105) could use their verified driver's license as a legal identification for voting purposes where required. In an embodiment, the civilian (105) could use the verified identification to cast an electronic vote in a public election. To prevent fraud and abuse, the voter could be required to take a self-photograph, which can be sent in to an electronic voting server or processing center, along with the civilian's vote and verified identification, and the submission is timestamped with a date/time retrieved from a trusted remote server computer, such as the United States Naval Observatory master clock time server. This timestamp can later be used to confirm that the vote was cast during the proper polling period, and the photo and verification can be used to confirm that the vote was properly cast by the voter in question, without reviewing the underlying vote itself. Each vote can also be assigned a serial number, which can be used to count the total number of votes and combat voter fraud by tracking which voter cast which vote (without regard to what the vote may be).

In an embodiment, the verified legal documents in the application may be used as a digital substitute for the physical document and could be accepted as official identification, not only for voting but also for other activities that require a valid, government-issued identification. Examples include, without limitation, boarding aircraft, applying for public benefits, applying for residential privileges such as access to public pools and libraries, reserving rooms in public facilities, and so forth.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smartphones, tablet computers, server farms, hardware appliances, mini-computers, mainframe computers, video game consoles, handheld video game products, and wearable computing devices including but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent Devices of this type include but are not limited to: network hardware, print servers, file servers, NAS and SAN, load balancers, and any other hardware capable of interacting with the systems and methods described herein in the matter of a conventional "computer."

As will be appreciated by one skilled in the art, some aspects of the present disclosure may be embodied as a system, method or process, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein"circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing, More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards. Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Program code embodied on a computer readable medium may be transmitted using any appropriate medium, including, but not limited to wireless, wireline, optical fiber cable, RF, etc., or any suitable combination of the foregoing.

Throughout this disclosure, the term "network" generally refers to a voice, data, or other telecommunications network over which computers communicate with each other. The term "server" generally refers to a computer providing a service over a network, and a "client" generally refers to a computer access ng or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "cloud" and "cloud computing" and similar terms refers to the practice of using a network of remote servers hosted and accessed over the Internet to store, manage, and process data, rather than local servers or personal computers.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"), A "web server" is a computer receiving and responding to HTTP requests, and a "web client" is a computer having a user agent sending and receiving responses to HTTP requests. The user agent is generally web browser software.

Throughout this disclosure, the term "real time" refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program, Those of ordinary skill in the art understand that, where the operational context is a graphical user interface, "real time"

normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Throughout this disclosure, the term "GUI" generally refers to a graphical user interface for a computing device. The design, arrangement, components, and functions of a graphical user interface will necessarily vary from device to device depending on, among other things, screen resolution, processing power, operating system, device function or purpose, and evolving standards and tools for user interface design. One of ordinary skill in the art will understand that graphical user interfaces generally include a number of widgets, or graphical control elements, which are generally graphical components displayed or presented to the user and which are manipulable by the user through an input device to provide user input, and which may also display or present to the user information, data, or output.

For purposes of this disclosure, there will also be discussion of a special type of computer referred to as a "mobile communication device" or simply "mobile device." A mobile communication device may be, but is not limited to, a smart phone, tablet PC, e-reader, satellite navigation system ("SatNav"), fitness device (e.g., a Fitbit™ Ear Jawbone™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network.

The term "device" may also be used alone to indicate a mobile device, or with a qualifier to distinguish different one such device from another, such as based on who the user of the device is (e.g., "civilian device" and "police device"). Additionally, the systems and methods described herein could be implemented using on-board vehicular computer systems, such as vehicle telematics system or other integrated computer system, rather than a physically carried mobile device such as a phone or tablet. Additionally, with the increasing adoption of automation technology in vehicles, the systems and methods described herein could be used in conjunction with partially or fully automated or self-driving vehicles (whether a civilian and/or police vehicle), and the interactions described herein could be negotiated or otherwise performed manually or automatically using the respective computer systems of each vehicle.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for electronic exchange of authenticated digital representations of documents in a contactless traffic stop, the method comprising:
   providing an application server communicably coupled to a telecommunication network;
   providing an agency server associated with an agency, said agency server communicably coupled to said telecommunication network;
   providing a civilian device associated with a civilian, said civilian device communicably coupled to said telecommunications network;
   providing a police device associated with a police officer, said police device communicably coupled to said telecommunications network;
   prior to a traffic stop of said civilian by said police officer:
      said civilian device capturing a first set of image data of at least one document issued by said agency;
      receiving, at said agency server via said telecommunications network, a copy of said first set of image data captured by said civilian device;
      said agency authenticating that said received copy of said first set of image data accurately represents said at least one document issued by said agency;
      receiving, at said application server from said agency server via said telecommunication network, a copy of said first set of image data authenticated by said agency, and an indication that said agency has authenticated said first set of image data;
      creating, at said application server, a checksum of said authenticated copy of said first set of image data received from said agency server; and
      receiving, at said civilian device from said application server via said telecommunications network, said authenticated copy of said first set of image data; and
   during a traffic stop of said civilian by said officer:
      receiving, at said civilian device from said police device, a request for an authenticated digital copy of said at least one civilian document;
      in response to said request, said police device receiving, from said civilian device via said telecommunications network, a second set of image data;
      receiving, at said application server from said police device via said telecommunications network, a copy of said second set of image data received by said police device;
      creating, at said application server, a second checksum of said second set of image data received by said application server from said police device;
      said application server comparing said first checksum and said second checksum;
      receiving, at said police device from said application server via said telecommunications network, an indication of the result of said comparing;
      receiving, at said civilian device from said police device, a request to conduct a field sobriety test of said civilian;
      said civilian device displaying on a display of said civilian device an interactive field sobriety test graphical user interface presenting a sequence of tasks to be performed by manipulation of said displayed field sobriety test graphical user interface;
      said civilian manipulating said displayed field sobriety test graphical user interface to complete said presented sequence of tasks; and
      during said manipulating, said civilian device capturing a real-time video stream of said civilian performing said manipulating step and transmitting said video stream to said police device.

2. The method of claim 1, wherein said at least one document is a driver's license issued to said civilian by a licensing bureau, and said agency is said licensing bureau.

3. The method of claim 1, wherein said at least one document is a proof of vehicle registration issued to said civilian by a vehicle registration bureau, and said agency is said vehicle registration bureau.

4. The method of claim 1, wherein said interactive field sobriety test comprises a game.

5. The method of claim 4, wherein said interactive field sobriety test game comprises an image matching game in which said civilian is presented with a plurality of similar images, selects one image from the plurality, and is presented with a second plurality of images including said selected image, and said civilian must select from said second plurality of images said one image.

6. The method of claim 4, wherein said interactive field sobriety test game comprises an image moving game in which said civilian is presented with a plurality of images moving towards the edges of said display and said civilian selects each image of said plurality of images before any of said plurality of images exit said display.

7. The method of claim 1, further comprising:
during said manipulating step, said police device displaying a timer indicating the amount of time that has passed since the beginning of said manipulating.

8. The method of claim 1, further comprising:
during said traffic stop of said civilian by said officer, displaying, in real-time on a display of said police device, biometric data for said civilian, said biometric data collected in real-time by a biometric monitoring device of said civilian and transmitted to said police device via said telecommunications network.

9. A system for electronic exchange of authenticated digital representations of documents in a contactless traffic stop, the system comprising
an application server communicably coupled to a telecommunication network;
an agency server associated with an agency, said agency server communicably coupled to said telecommunications network;
a civilian device associated with a civilian, said civilian device communicably coupled to said telecommunications network; and
a police device associated with a police officer, said police device communicably coupled to said telecommunications network:
wherein prior to a traffic stop of said civilian by said police officer:
said civilian device captures a first set of image data of at least one document issued by said agency;
agency server receives via said telecommunications network a copy of said first set of image data captured by said civilian device;
said agency authenticates that said received copy of said first set of image data accurately represents said at least one document issued by said agency;
said application server receives from said agency server vis said telecommunication network, a copy of said first set of image data authenticated by said agency, and an indication that said agency has authenticated said first set of image data; and
said application server creates a checksum of said authenticated copy of said first set of image data received from said agency server; and
said civilian device receives from said application server via said telecommunications network, said authenticated copy of said first set of image data; and
wherein during a traffic stop of said civilian by said officer:
said civilian device receives from said police device a request for an authenticated digital copy of said at least one civilian document;
in response to said request, said police device receives, from said civilian device via said telecommunications network, a second set of image data;
said application server receives from said police device via said telecommunications network, a copy of said second set of image data received by said police device;
said application server creates a second checksum of said second set of image data received by said application server from said police device;
said application server compares said first checksum and said second checksum;
said police device receives from said application server via said telecommunications network, an indication of the result of said comparing;
said civilian device receives from said police device a request to conduct a field sobriety test of said civilian;
said civilian device displays on a display of said civilian device an interactive field sobriety test graphical user interface presenting a sequence of tasks to be performed by manipulation of said displayed field sobriety test graphical user interface;
said civilian device capturing a real-time video stream of said civilian manipulating said displayed field sobriety test graphical user interface to complete a presented sequence of tasks; and
said civilian device transmitting said real-time video stream to said police device.

10. The system of claim 9, wherein said at least one document is a driver's license issued to said civilian by a licensing bureau, and said agency is said licensing bureau.

11. The system of claim 9, wherein said at least one document is a proof of vehicle registration issued to said civilian by a vehicle registration bureau, and said agency is said vehicle registration bureau.

12. The system of claim 9, wherein said interactive field sobriety test comprises a game.

13. The system of claim 12, wherein said game selected from the group consisting of: an image matching game, and an image moving game.

14. The system of claim 9, further comprising:
said police device displaying a timer indicating the amount of time that has passed since said civilian began manipulating said displayed field sobriety test graphical user interface to complete said presented sequence of tasks.

15. The system of claim 9, further comprising:
wherein during said traffic stop of said civilian by said officer, said police device displays biometric data for said civilian, said biometric data collected in real-time by a biometric monitoring device of said civilian and transmitted to said police device via said telecommunications network.

* * * * *